(12) United States Patent
Sjödin et al.

(10) Patent No.: US 9,694,434 B2
(45) Date of Patent: Jul. 4, 2017

(54) PLATE HEAT EXCHANGER

(71) Applicant: ALFA LAVAL CORPORATE AB, Lund (SE)

(72) Inventors: Per Sjödin, Lund (SE); Kristian Walter, Genarp (SE)

(73) Assignee: ALFA LAVAL CORPORATE AB, Lund (SE)

( * ) Notice: Subject to any disclaimer, the term of this patent is extended or adjusted under 35 U.S.C. 154(b) by 423 days.

(21) Appl. No.: 14/382,639

(22) PCT Filed: Mar. 27, 2013

(86) PCT No.: PCT/EP2013/056604
§ 371 (c)(1),
(2) Date: Sep. 3, 2014

(87) PCT Pub. No.: WO2013/144251
PCT Pub. Date: Oct. 3, 2013

(65) Prior Publication Data
US 2015/0060030 A1    Mar. 5, 2015

(30) Foreign Application Priority Data

Mar. 28, 2012 (EP) .................................. 12161742

(51) Int. Cl.
*B23K 1/20* (2006.01)
*B23K 35/365* (2006.01)
(Continued)

(52) U.S. Cl.
CPC ................ *B23K 1/20* (2013.01); *B21D 53/04* (2013.01); *B23K 1/00* (2013.01); *B23K 1/0008* (2013.01);
(Continued)

(58) Field of Classification Search
CPC .. F28F 2275/04; F28F 2275/061; F28F 3/025; F28F 3/046; F28F 21/081;
(Continued)

(56) References Cited

U.S. PATENT DOCUMENTS 4,410,604 A * 10/1983 Pohlman ............ B23K 35/3066
420/50
4,614,296 A * 9/1986 Lesgourgues ......... B22F 1/0003
228/119
(Continued)

FOREIGN PATENT DOCUMENTS

| CN | 1726112 A | 1/2006 |
|---|---|---|
| CN | 101097124 A | 1/2008 |

(Continued)

OTHER PUBLICATIONS

English translation of the Chinese Office Action and Search Report for Chinese Application No. 201380017042.X, dated Feb. 22, 2016.
(Continued)

*Primary Examiner* — Tho V Duong
(74) *Attorney, Agent, or Firm* — Birch, Stewart, Kolasch & Birch, LLP

(57) ABSTRACT

Disclosed is a method for producing a permanently joined plate heat exchanger comprising a plurality of metal heat exchanger plates having a solidus temperature above 1100° C., provided beside each other and forming a plate package with first plate interspaces for a first medium and second plate interspaces for a second medium, wherein the first and second plate interspaces are provided in an alternating order in the plate package, wherein each heat exchanger plate comprises a heat transfer area and an edge area comprising bent edges which extend around the heat transfer area, wherein a first surface of the plates forms a convex shape and a second surface of the plates forms a concave shape, wherein the heat transfer area comprises a corrugation of (Continued)

elevations and depressions, wherein said corrugation of the plates and the bent edges are provided by pressing the plates. Also disclosed is a plate heat exchanger produced by the method.

33 Claims, 6 Drawing Sheets

(51) Int. Cl.

| | | |
|---|---|---|
| *B23K 35/00* | (2006.01) | |
| *B23K 35/02* | (2006.01) | |
| *C22C 19/00* | (2006.01) | |
| *C22C 1/02* | (2006.01) | |
| *B23K 1/00* | (2006.01) | |
| *B23K 35/24* | (2006.01) | |
| *B23K 35/34* | (2006.01) | |
| *B23K 35/362* | (2006.01) | |
| *C23C 30/00* | (2006.01) | |
| *B21D 53/04* | (2006.01) | |
| *B32B 15/01* | (2006.01) | |
| *C23C 24/10* | (2006.01) | |
| *B23K 20/00* | (2006.01) | |
| *B23K 20/24* | (2006.01) | |
| *B23K 35/36* | (2006.01) | |
| *F28F 3/04* | (2006.01) | |
| *F28F 21/08* | (2006.01) | |
| *F28D 9/00* | (2006.01) | |
| *B23K 101/00* | (2006.01) | |

(52) U.S. Cl.
CPC ............ *B23K 1/0012* (2013.01); *B23K 1/203* (2013.01); *B23K 20/002* (2013.01); *B23K 20/24* (2013.01); *B23K 35/00* (2013.01); *B23K 35/001* (2013.01); *B23K 35/004* (2013.01); *B23K 35/007* (2013.01); *B23K 35/02* (2013.01); *B23K 35/025* (2013.01); *B23K 35/0244* (2013.01); *B23K 35/24* (2013.01); *B23K 35/34* (2013.01); *B23K 35/36* (2013.01); *B23K 35/362* (2013.01); *B23K 35/365* (2013.01); *B23K 35/3613* (2013.01); *B32B 15/01* (2013.01); *C22C 1/02* (2013.01); *C22C 19/00* (2013.01); *C23C 24/10* (2013.01); *C23C 30/00* (2013.01); *C23C 30/005* (2013.01); *F28D 9/0062* (2013.01); *B23K 2201/00* (2013.01); *F28D 9/0012* (2013.01); *F28F 3/042* (2013.01); *F28F 21/083* (2013.01); *F28F 21/089* (2013.01); *Y10T 29/49366* (2015.01); *Y10T 403/479* (2015.01); *Y10T 428/12778* (2015.01); *Y10T 428/12986* (2015.01); *Y10T 428/25* (2015.01); *Y10T 428/259* (2015.01); *Y10T 428/266* (2015.01); *Y10T 428/273* (2015.01); *Y10T 428/2924* (2015.01); *Y10T 428/2982* (2015.01)

(58) Field of Classification Search
CPC ........ F28F 21/082; F28F 21/083; F28F 21/08; B23K 1/0012; B23K 1/203; B23K 1/002; B23K 1/00; B23K 1/008; B23K 1/0018; B23K 35/36; B23K 35/3053; B23K 35/3607; B23K 35/3613; B23K 35/362; B23K 35/365; B23K 35/001; B23K 35/004; B23K 35/007; B23K 35/0244; B23K 35/00; B23K 35/24; B23K 35/34; B32B 15/01; C22C 19/00; C23C 24/10; C23C 30/00; C23C 30/005; C23C 1/051; C23C 1/02; F28D 9/0062
See application file for complete search history.

(56) References Cited

U.S. PATENT DOCUMENTS

| | | | | |
|---|---|---|---|---|
| 4,987,955 | A * | 1/1991 | Bergqvist | ............... F28D 9/005 165/166 |
| 5,849,080 | A | 12/1998 | Okuno | |
| 6,109,505 | A | 8/2000 | Malie et al. | |
| 6,200,690 | B1 * | 3/2001 | Rabinkin | ........... B23K 35/0233 148/403 |
| 2008/0003451 | A1 | 1/2008 | Suzuki et al. | |
| 2008/0127494 | A1 * | 6/2008 | Rassmus | .............. B23K 1/0012 29/890.054 |
| 2009/0151917 | A1 | 6/2009 | Meschke et al. | |
| 2010/0055495 | A1 | 3/2010 | Sjödin | |
| 2011/0024096 | A1 * | 2/2011 | Christensen | ............ F28D 9/005 165/166 |
| 2011/0226459 | A1 * | 9/2011 | Sjodin | ................. B23K 35/308 165/185 |
| 2011/0250470 | A1 * | 10/2011 | Hartmann | ............ B23K 1/0012 428/679 |
| 2016/0202005 | A1 * | 7/2016 | Sjodin | ................ B23K 35/3033 165/166 |

FOREIGN PATENT DOCUMENTS

| | | |
|---|---|---|
| CN | 101588890 A | 11/2009 |
| CN | 101605828 A | 12/2009 |
| CN | 101405554 B | 5/2011 |
| EP | 0827437 B1 | 8/2000 |
| EP | 1572415 B1 | 7/2006 |
| EP | 1 982 781 A1 | 10/2008 |
| JP | 9-183606 A | 7/1997 |
| JP | 11-287576 A | 10/1999 |
| JP | 2002-361479 A | 12/2002 |
| JP | 2004-512964 A | 4/2004 |
| JP | 2008-518786 A | 6/2008 |
| JP | 2008-542030 A | 11/2008 |
| KR | 10-2008-0015871 A | 2/2008 |
| KR | 10-2009-0084942 A | 8/2009 |
| RU | 2167751 C2 | 5/2001 |
| SU | 659326 A1 | 4/1979 |
| WO | WO 02/38327 A1 | 5/2002 |
| WO | WO 2006/050334 A2 | 5/2006 |
| WO | WO 2006/126953 A1 | 11/2006 |
| WO | WO 2008/060225 A1 | 5/2008 |
| WO | WO 2008/060226 A2 | 5/2008 |

OTHER PUBLICATIONS

English translation of the Russian Search Report for Russian Application No. 2014142883/02, dated May 30, 2016.
International Search Report issued in PCT/EP2013/056604, mailed on Jul. 25, 2013.
Search Report issued in European Patent Application No. 12 16 1742, dated Sep. 27, 2012.
Written Opinion issued in PCT/EP2013/056604, mailed on Jul. 25, 2013.
English translation of Korean Office Action, issued Nov. 4, 2015, for Korean Application No. 10-2014-7026384.

* cited by examiner

PLATE HEAT EXCHANGER

BACKGROUND

The invention relates to a method for producing a plate heat exchanger and to a plate heat exchanger produced by the method.

TECHNICAL FIELD

Different methods may be used for joining alloys having high melting temperatures. In this context "high melting temperature" is a melting temperature above 900° C. Welding is a common method wherein the parent metal is melted with or without additional material, i e a cast product is created by melting and re-solidification.

Brazing is a process for joining solid metals in close proximity by introducing a liquid metal that melts above 450° C. A brazed joint generally results when an appropriate filler alloy is selected, the parent metal surfaces are clean and remain clean during heating to the flow temperature of the brazing alloy, and a suitable joint design is used. During the process the braze filler is melted at a temperature above 450° C., i e a liquid interface is formed at a temperature lower than the liquidus temperature of the parent metal to be joined. In order to achieve brazing the liquid interface should have good wetting and flow.

Soldering is a process in which two or more metal items are joined by melting and flowing of a filler metal, i.e. a solder, into the joint, the solder having a lower melting point than the work-piece. In brazing, the filler metal melts at a higher temperature than the solder, but the work-piece metal does not melt. The distinction between soldering and brazing is based on the melting temperature of the filler alloy. A temperature of 450° C. is usually used as a practical delineating point between soldering and brazing.

In general, the procedure of brazing involves application of a braze filler in contact with the gap or the clearance between the parent metal to be joined. During the heating process the braze filler melts and fills the gap to be joined. In the brazing process there are three major stages, wherein the first stage is called the physical stage. The physical stage includes wetting and flowing of the braze filler. The second stage normally occurs at a given joining temperature. During this stage there is solid-liquid interaction, which is accompanied by substantial mass transfer. The parent metal volume that immediately adjoins the liquid filler metal either dissolves or is reacted with the filler metal in this stage. At the same time a small amount of elements from the liquid phases penetrates into the solid parent metal. This redistribution of components in the joint area results in changes to the filler metal composition, and sometimes, the onset of solidification of the filler metal. The last stage, which overlaps the second, is characterized by the formation of the final joint microstructure and progresses during solidification and cooling of the joint.

Another method for joining two metal parts (parent materials) is transient liquid phase diffusion bonding (TLP bonding) where diffusion occurs when a melting point depressant element from an interlayer moves into lattice and grain boundaries of the metal parts at the bonding temperature. Solid state diffusional processes then lead to a change of composition at the bond interface and the dissimilar interlayer melts at a lower temperature than the parent materials. Thus a thin layer of liquid spreads along the interface to form a joint at a lower temperature than the melting point of either of the metal parts. A reduction in bonding temperature leads to solidification of the melt, and this phase can subsequently be diffused away into the metal parts by holding at bonding temperature for a period of time.

Joining methods such as welding, brazing and TLP-bonding successfully joins metal parts. However, welding has its limitations as it may be very expensive or even impossible create a large number of joints when they are hard to access. Brazing has also its limitations, for example in that it sometimes it is hard to properly apply or even determine a most suitable filler metal. TLP-bonding as advantageous when it comes to joining different material but has its limitations. For example, it is often hard to find a suitable interlayer and the method is not really suitable for creating a joint where a large gaps is to be filled or when a relatively large joint is to be formed.

Thus, many factors are involved when selecting a certain joining method. Factors that also are crucial are cost, productivity, safety, process speed and properties of the joint that joins the metal parts as well as properties of the metal parts per se after the joining. Even though the aforementioned methods have their advantages, there is still a need for a joining method to be used as a complement to the present methods, in particular if factors like cost, productivity, safety and process speed are taken into account.

SUMMARY

The object of the invention is to improve the above techniques and the prior art. In particular, it is an object to provide a method to produce a permanently joined plate heat exchanger in a simple and reliable manner while still producing a strong joint between the plates of the plate heat exchanger.

To solve these objects a method for producing a permanently joined plate heat exchanger comprising a plurality of metal heat exchanger plates having a solidus temperature above 1100° C. is provided. The plates are provided beside each other and forming a plate package with first plate interspaces for a first medium and second plate interspaces for a second medium, wherein the first and second plate interspaces are provided in an alternating order in the plate package. Each heat exchanger plate comprises a heat transfer area and an edge area comprising bent edges which extend around the heat transfer area. A first surface of the plates forms a convex shape and a second surface of the plates forms a concave shape and the heat transfer area comprises a corrugation of elevations and depressions. Said corrugation of the plates and the bent edges are provided by pressing the plates. The method comprises the steps of:

applying a melting depressant composition on at least a part of the first convex surface of a first plate, the melting depressant composition comprising a melting depressant component that comprises at least 25 wt % boron and silicon for decreasing a melting temperature of the first plate, and optionally, a binder component for facilitating the applying of the melting depressant composition on the first surface, bringing a second concave surface of a second plate into contact with the melting depressant composition on said first convex surface of the first plate by stacking the plates into a plate package, heating the first and second plates to a temperature above 1100° C., said first convex surface of the first plate thereby melting such that a surface layer of the first plate melts and, together with the melting depressant component, forms a molten metal layer that is in contact with the second plate at contact points between the first plate and the second plate, and allowing the molten metal layer to solidify, such that a joint is obtained at the contact points between the plates in the plate package and such that the bent edges form a tight fit between the bent edges of the plates in the plate package.

The metal of the plates may have the form of e.g. iron-, nickel and cobalt-based metallic alloys, as they typically have a solidus temperature above 1100° C. The plates may not be pure copper, copper-based alloys, pure aluminum or aluminum-based alloys that do not have a solidus temperature above 1100° C. The metal in the metal plates or even the metal plate per se may be referred to as the "parent metal" or "parent material". In this context, an "iron-based" alloy is an alloy where iron has the largest weight percentage of all elements in the alloy (wt %). The corresponding situation also applies for nickel-, cobalt-, chromium- and aluminum-based alloys.

As indicated, the melting depressant composition comprises at least one component, which is the melting depressant component. Optionally, the melting depressant composition comprises a binder component. All substances or parts of the melting depressant composition that contributes to decreasing a melting temperature of at least the first plate is considered to be part of the melting depressant component. Parts of the melting depressant composition that are not involved in decreasing a melting temperature of at least the first plate but instead "binds" the melting depressant composition, such that it forms e.g. a paste, paint or slurry, is considered to be part of the binder component. Of course, the melting depressant component may include other components, such as small amounts of filler metal. However, such filler metal may not represent more than 75 wt % of the melting depressant component, since at least 25 wt % of the melting depressant component comprises boron and silicon. If a filler metal is included in the melting depressant composition, it is always part of the melting depressant component.

In this context, "boron and silicon" means the sum of boron and silicon in the melting depressant component, as calculated in wt %. Here, wt % means weight percentage which is determined by multiplying mass fraction by 100. As is known, mass fraction of a substance in a component is the ratio of the mass concentration of that substance (density of that substance in the component) to the density of the component. Thus, for example, at least 25 wt % boron and silicon means that the total weight of boron and silicon is at least 25 g. in a sample of 100 g melting depressant component. Obviously, if a binder component is comprised in the melting depressant composition, then the wt % of boron and silicon in the melting depressant composition may be less than 25 wt %. However, at least 25 wt % boron and silicon are always present in the melting depressant component, which, as indicated, also includes any filler metal that may be included, i.e. filler metal is always seen as part of the melting depressant composition.

The "boron" includes all boron in the melting depressant component, which includes elemental boron as well as boron in a boron compound. Correspondingly, the "silicon" includes all silicon in the melting depressant component, which includes elemental silicon as well as silicon in a silicon compound. Thus, both the boron and silicon may, in the melting depressant component, be represented by the boron and silicon in various boron and silicon compounds.

Obviously, the melting depressant composition is very different from conventional brazing substances since they have much more filling metal relative melting depressing substances like boron and silicon. Generally, brazing substances have less than 18 wt % boron and silicon.

The method is advantageous in that filler metal may be reduced or even excluded and in that it may be applied for metal plates that are made of different materials. Of course, the melting depressant composition may be applied on the second metal plate as well.

The boron may originate from any of elemental boron and boron of a boron compound selected from at least any of the following compounds: boron carbide, silicon boride, nickel boride and iron boride. The silicon may originate from any of elemental silicon and silicon of a silicon compound selected from at least any of the following compounds: silicon carbide, silicon boride and ferrosilicon.

The melting depressant component may comprise at least 40 wt % boron and silicon, or may even comprise at least 85 wt % boron and silicon. This means that if any filler metal is present it is present in amounts of less than 60 wt % respectively less than 15 wt %. The melting depressant component may even comprise at least 95 wt % boron and silicon.

Boron may constitute at least 10 wt % of the boron and silicon content of the melting depressant compound. This means that, when the melting depressant component comprise at least 25 wt % boron and silicon, then the melting depressant component comprises at least at least 2.5 wt % boron. Silicon may constitute at least 55 wt % of the boron and silicon content of the melting depressant compound.

The melting depressant component may comprise less than 50 wt % metallic elements, or less than 10 wt % metallic elements. Such metallic elements corresponds to the "metal filler" discussed above. Such small amounts of metallic elements or metal filler differentiates the melting depressant composition starkly from e.g. known brazing compositions since they comprise at least 60 wt % metallic elements. Here, "metallic elements" include e.g. all transition metals, which are the elements in the d-block of the periodic table, which includes groups 3 to 12 on the periodic table. This means that, for example, iron (Fe), nickel (Ni), cobalt (Co), chromium (Cr) and molybdenum (Mo) are "metallic elements. Elements that are not "metallic elements" are the noble gases, the halogens and the following elements: boron (B), carbon (C), silicon (Si), nitrogen (N), phosphorus (P), arsenic (As), oxygen (O), sulfur (S), selenium (Se) and tellurium (Tu). It should be noted that, for example, if the boron comes from the compound nickel boride, then the nickel-part of this compound is a metallic element that is included in the metallic elements that in one embodiment should be less than 50 wt % and in the other embodiment less than 10 wt %.

The plates may comprise a thickness of 0.3-0.6 mm and the applying of the melting depressant composition may then comprise applying an average of 0.02-0.12 mg boron and silicon per $mm^2$ on the surface of the first metal part. The applying of an average of 0.02-0.12 mg boron and silicon per $mm^2$ on the surface of the first plate includes any indirect application via e.g. the second plate, for example boron and silicon that is transferred from the second plate to the first plate. Thus, the boron and silicon referred to herein must not necessarily have been applied directly on the first metal part, as long as it still contributes to the melting of the surface layer of the first plate.

The first plate may comprise a thickness of 0.6-1.0 mm and the applying of the melting depressant composition may then comprise applying an average of 0.02-1.0 mg boron and silicon per mm$^2$ on the surface of the first plate. As before, the application includes also indirect "application" via the second plate.

The first plate may comprise a thickness of more than 1.0 mm and the applying of the melting depressant composition may then comprise applying an average of 0.02-5.0 mg boron and silicon per mm$^2$ on the surface of the first plate.

The applying of the melting depressant composition may be made before the pressing of the plates. The applying of the melting depressant composition may alternatively be made after the pressing of the plates.

The applying of the melting depressant composition may further be made after stacking the plates into a plate package by flushing a suspension containing the melting depressant composition through the plate package.

The applying of the melting depressant composition may be made by means of screen-printing. or by means of sputtering onto a coil which is cut into plates.

The first surface may have an area that is larger than an area defined by the contact point on said first surface part, such that metal in the melted metal layer flows to the contact point when allowing the joint to form. Such flow is typically caused by capillary action.

The area of the surface may be at least 10 times larger than the area defined by the contact point. The area of the surface may be even larger (or the contact point relatively smaller), such as at least 20 or 30 times larger than the area defined by the contact point. The area of the surface refers to the area of the surface from where melted metal flows to form the joint.

The area of the surface may be at least 3 times larger than a cross-sectional area of the joint. The area of the surface may be even bigger (or the cross-sectional area of the joint relatively smaller), such as it is at least 6 or 10 times larger than the area defined by the contact point. The cross-sectional area of the joint may be defined as the cross-sectional area that the joint has across a plane that is parallel to the surface where the contact point is located, at a location where the joint has its smallest extension (cross sectional area).

The joint may comprise at least 50 wt % or at least 85 wt % or even 100 wt % metal (metallic element) that, before the heating, was part of any of the first metal part and the second metal part. This is accomplished by allowing metal of the metal parts to flow to the contact point and form the joint. A joint that is formed in this way is very different from joints that are formed by brazing, since such joints generally comprises at least 90 wt % metal that, before the brazing, was part of a filler metal of the a brazing substance that was used to form the joint.

The plates may comprise any of:
i) >50 wt % Fe, <13 wt % Cr, <1 wt % Mo, <1 wt % Ni and <3 wt % Mn;
ii) >90 wt % Fe;
iii) >65 wt % Fe and >13 wt % Cr;
iv) >50 wt % Fe, >15.5 wt % Cr and >6 wt % Ni;
v) >50 wt % Fe, >15.5 wt % Cr, 1-10 wt % Mo and >8 wt % Ni;
vi) >97 wt % Ni;
vii) >10 wt % Cr and >60 wt % Ni;
viii) >15 wt % Cr, >10 wt % Mo and >50 wt % Ni;
ix) >70 wt % Co; and
x) >10 wt % Fe, 0.1-30 wt % Mo, 0.1-30 wt % Ni and >50 wt % Co.

The above means that the first plate, and the second plate as well, may be made of a large number of different alloys. Obviously, the examples above are balanced with other metals or elements, as common within the industry.

According to another aspect a plate heat exchanger comprising a plurality of metal heat exchanger plates having a solidus temperature above 1100° C. is provided. The plates are provided beside each other and forming a plate package with first plate interspaces for a first medium and second plate interspaces for a second medium, wherein the first and second plate interspaces are provided in an alternating order in the plate package. Each heat exchanger plate comprises a heat transfer area and an edge area comprising bent edges which extend around the heat transfer area. A first surface of the plates forms a convex shape and a second surface of the plates forms a concave shape and the heat transfer area comprises a corrugation of elevations and depressions. Said corrugation of the plates and the bent edges are provided by pressing the plates. The plate heat exchanger is produced according to the method above or any of its embodiments.

According to another aspect of the invention the plate heat exchanger comprises a first plate that is joined with a second plate by a joint, the plates having a solidus temperature above 1100° C., wherein the joint comprises at least 50 wt % metallic elements that have been drawn from an area (A1) that surrounds the joint and was part of any of the first plate and the second plate is provided.

Different objectives, features, aspects and advantages of the method, the products and the melting depressant composition will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
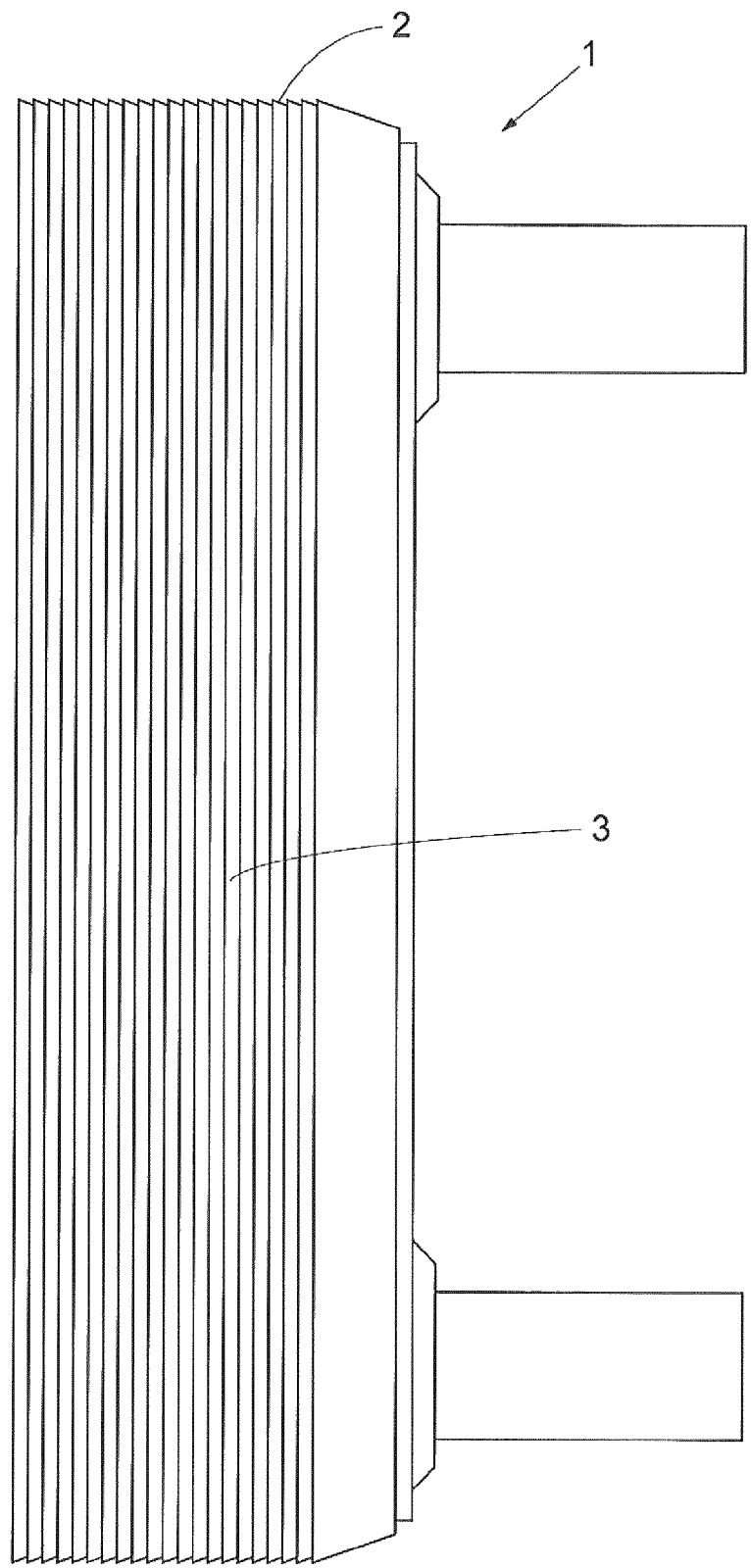
FIG. 1 is a side view of a plate heat exchanger of the prior art.
Figure 3:
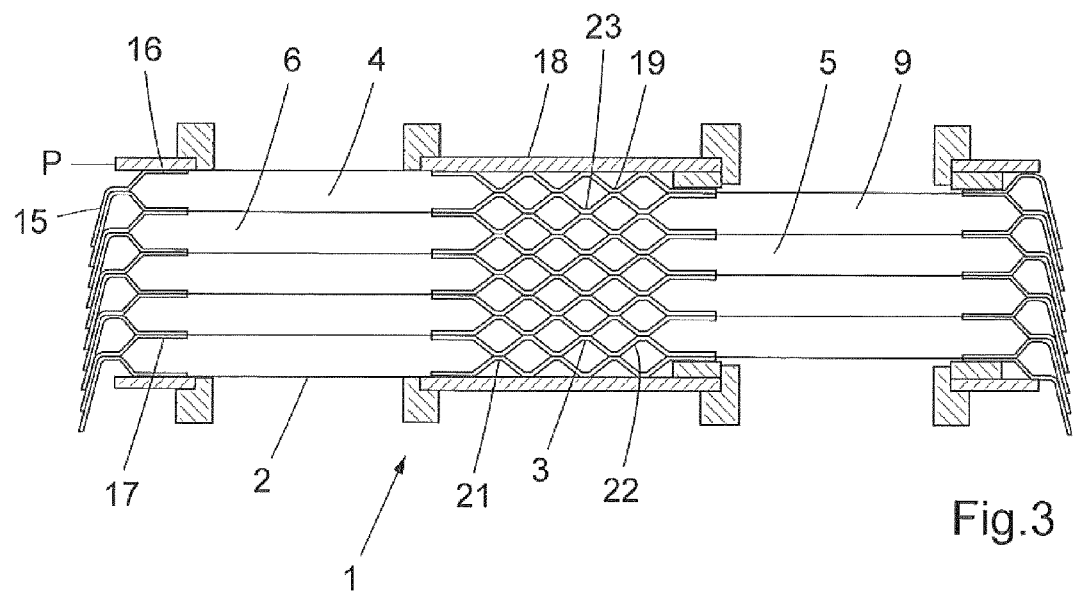
FIG. 3 is a cross-sectional view of a plate heat exchanger according FIG. 1.
Figure 2:
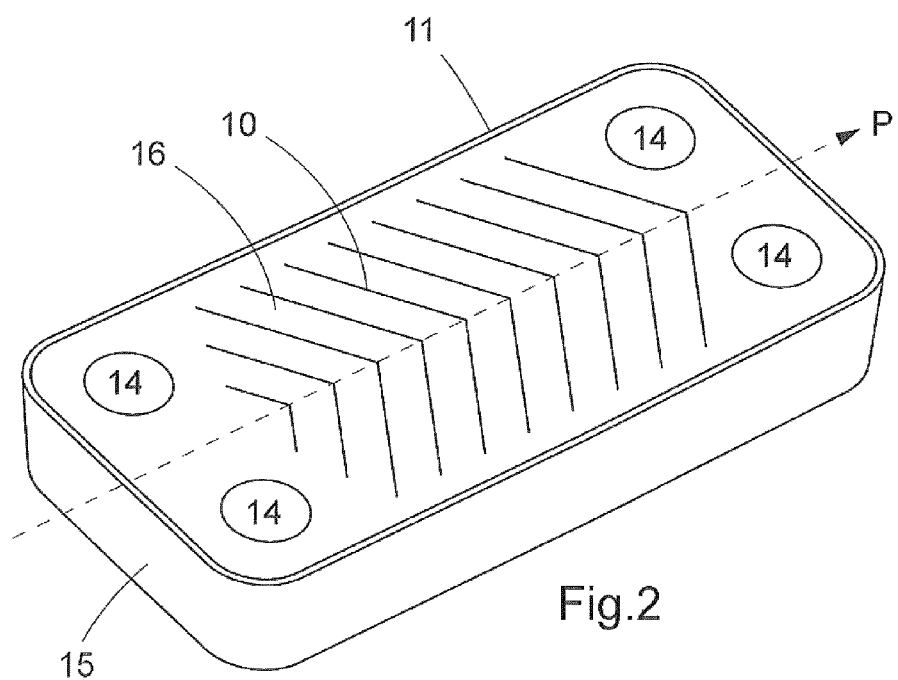
FIG. 2 is a plan view of a plate heat exchanger according to FIG. 1.

With reference to the figures attached, a plate heat exchanger is disclosed, see FIGS. 1, 2 and 3, respectively.

The plate heat exchanger 1 comprises a plurality of heat exchanger plates 2 which are provided beside each other for forming a plate package 3 with first plate interspaces 4 for a first medium and second plate interspaces 5 for a second medium. The first plate interspaces 4 and the second plate interspaces 5 are provided in an alternating order in the plate package 3, i.e. every second plate interspace is a first plate interspace 4 and every second a second plate interspace 5, see FIG. 3.

The plate heat exchanger 1 disclosed in FIGS. 1-3 has heat exchanger plates 2 which are permanently joined to each other. The two outermost heat exchanger plates may form or be replaced by end plates.

The plate heat exchanger 1 also comprises inlet and outlet channels 6-9, which are arranged to convey the first medium into the first plate interspaces 4 and out from the same, and to convey the second medium into the second plate interspaces 5 and out from the same. Each heat exchanger plate 2 extends a main extension plane p, and comprises a heat transfer area 10 and an edge area 11 extending around the heat transfer area 10. Each heat exchanger plate 1 also comprises two porthole areas 12 and 13, which are provided at a first end 1A of the heat exchanger plate 1 and at a second end 1 B of the heat exchanger plate 1, respectively. The porthole areas 12 and 13 are located inside the edge area 11, and more specifically between the edge area 11 and the heat transfer area 10. Each porthole area 12, 13 comprises at least two portholes 14 which are aligned with respective inlet and outlet channels 6-9. Each heat exchanger plate 1 also comprises a surrounding outer flange or bent edge 15. The bent edge or flange 15 is provided outside or forms an outer part of the edge area 11. It is to be noted that the heat exchanger plates 2 also may have an outer bent edge 15 which extends along a part of the periphery of the heat exchanger plate 1. Accordingly the plates 2 each have a first surface 16 having a convex shape and a second surface 17 having a concave shape.

The heat transfer area 10 comprises a corrugation of elevations 18 and depressions 19. Such depressions and elevations may e g be formed as ridges and grooves or as dimples.

The plates 2 may be made of of eg iron-, nickel and cobalt-based metallic alloys, as they typically have a solidus temperature above 1100° C. The plates may not be made of pure copper, pure aluminum or aluminum-based alloys that do not have a solidus temperature above 1100° C. For example the plates may typically be made of iron-, nickel- and cobalt-based alloys.

The metal in the plates 2 or even the plates 2 per se may be referred to as the "parent metal" or "parent material". In this context, an "iron-based" alloy is an alloy where iron has the largest weight percentage of all elements in the alloy (wt %). The corresponding situation also applies for e g nickel-, copper-, cobalt-, chromium- and aluminum-based alloys.

Figure 4:
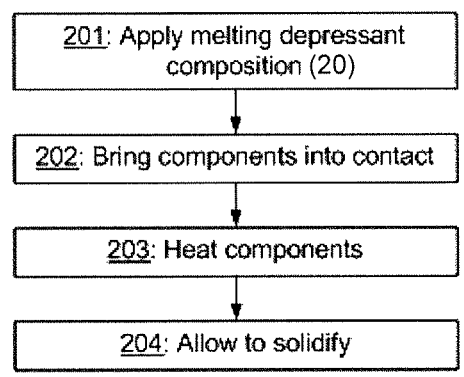
FIG. 4 is a flow chart of a method for joining plates in plate heat exchanger according to the method of the invention.

With reference to FIG. 4 a flow chart of a method for joining plates 2 for a plate heat exchanger 1 is illustrated. The plates 2 may be made of different materials as described above.

In a first step 201 a melting depressant composition 20 is applied on at least a part of the first convex surface 16 of the plates. The melting depressant composition 20 may be applied on only a part of the convex surface 16 or on substantially all of the convex surface 16. In an alternative embodiment the melting depressant composition 20 may also be applied on the second concave surface 17 of the plates 2 but then in an amount which is smaller than the amount of melting depressant composition applied on the first convex surface 16.

The application per se may be done by conventional techniques, e.g. by spraying, screen printing, rolling or painting in case the melting depressant composition comprises a binder component, by PVD or CVD or with only melting point depressants in case not binder component is used.

The melting depressant composition 20 comprises at least one component, which is the melting depressant component. Optionally, the melting depressant composition comprises a binder component. All substances or parts of the melting depressant composition that contributes to decreasing a melting temperature of at least the first metal part is considered to be part of the melting depressant component. Parts of the melting depressant composition that are not involved in decreasing a melting temperature of at least the first metal part but instead "binds" the melting depressant composition, such that it forms e.g. a paste, paint or slurry, is considered to be part of the binder component. Of course, the melting depressant component may include other components, such as small amounts of filler metal. However, such filler metal may not represent more than 75 wt % of the melting depressant component, since at least 25 wt % of the melting depressant component comprises boron and silicon. If a filer metal is included in the melting depressant composition, it is always part of the melting depressant component.

In this context, "boron and silicon" means the sum of boron and silicon in the melting depressant component, as calculated in wt %. Here, wt % means weight percentage which is determined by multiplying mass fraction by 100. As is known, mass fraction of a substance in a component is the ratio of the mass concentration of that substance (density of that substance in the component) to the density of the component. Thus, for example, at least 25 wt % boron and silicon means that the total weight of boron and silicon is at least 25 g. in a sample of 100 g melting depressant component. Obviously, if a binder component is comprised in the melting depressant composition, then the wt % of boron and silicon in the melting depressant composition may be less than 25 wt %. However, at least 25 wt % boron and silicon are always present in the melting depressant component, which, as indicated, also includes any filler metal that may be included, i.e. filler metal is always seen as part of the melting depressant composition.

The "boron" includes all boron in the melting depressant component, which includes elemental boron as well as boron in a boron compound. Correspondingly, the "silicon" includes all silicon in the melting depressant component, which includes elemental silicon as well as silicon in a silicon compound. Thus, both the boron and silicon may, in the melting depressant component, be represented by the boron and silicon in various boron and silicon compounds.

Obviously, the melting depressant composition is very different from conventional brazing substances since they have much more filling metal relative melting depressing substances like boron and silicon. Generally, brazing substances have less than 18 wt % boron and silicon.

The method is advantageous in that filler metal may be reduced or even excluded and in that it may be applied for metal parts that are made of different materials. It may also be used within a wide range of applications, for example for joining heat transfer plates or any suitable metal objects that otherwise are joined by e.g. welding or conventional brazing.

In another embodiment of the invention the melting depressant composition 20 is applied on a coil which subsequently is cut into plates 2.

In a following step 202 the second concave surface 17 of a second plate 22 is brought into contact with the melting depressant composition 20 at contact points 23 on the first convex surface 16 of the first plate 21. By stacking the first and second plates a plate package 3 is created. This can be done manually or automatically by employing conventional, automated manufacturing systems. Of course, the melting depressant composition 20 may be applied on the second concave surface 17 of the second plates 22 as well.

The boron may originate from any of elemental boron and boron of a boron compound selected from at least any of the following compounds: boron carbide, silicon boride, nickel boride and iron boride. The silicon may originate from any of elemental silicon and silicon of a silicon compound selected from at least any of the following compounds: silicon carbide, silicon boride and ferrosilicon.

The melting depressant component may comprise at least 40 wt % boron and silicon, or may even comprise at least 85 wt % boron and silicon. This means that if any filler metal is present it is present in amounts of less than 60 wt % respectively less than 15 wt %. The melting depressant component may even comprise at least 95 wt % boron and silicon.

Boron may constitute at least 10 wt % of the boron and silicon content of the melting depressant compound. This means that, when the melting depressant component comprise at least 25 wt % boron and silicon, then the melting depressant component comprises at least at least 2.5 wt % boron. Silicon may constitute at least 55 wt % of the boron and silicon content of the melting depressant compound.

The melting depressant component may comprise less than 50 wt % metallic elements, or less than 10 wt % metallic elements. Such metallic elements corresponds to the "metal filler" discussed above. Such small amounts of metallic elements or metal filler differentiates the melting depressant composition 20 from e.g. known brazing compositions since they comprise at least 60 wt % metallic elements. Here, "metallic elements" include e.g. all transition metals, which are the elements in the d-block of the periodic table, which includes groups 3 to 12 on the periodic table. This means that, for example, iron (Fe), nickel (Ni), cobalt (Co), chromium (Cr) and molybdenum (Mo) are "metallic elements. Elements that are not "metallic elements" are the noble gases, the halogens and the following elements: boron (B), carbon (C), silicon (Si), nitrogen (N), phosphorus (P), arsenic (As), oxygen (O), sulfur (S), selenium (Se) and tellurium (Tu). It should be noted that, for example, if the boron comes from the compound nickel boride, then the nickel-part of this compound is a metallic element that is included in the metallic elements that in one embodiment should be less than 50 wt % and in the other embodiment less than 10 wt %.

The plates 2 may have a thickness of 0.3-0.6 mm and the applying 201 of the melting depressant composition 20 may then comprise applying an average of 0.02-0.12 mg boron and silicon per $mm^2$ on the first convex surface 16 of the first plate 21. The applying of an average of 0.02-0.12 mg boron and silicon per $mm^2$ on the surface of the first convex surface 16 includes any indirect application via e.g. the second concave surface 17, for example boron and silicon that is transferred from the second plate 22 to the first plate 21. Thus, the boron and silicon referred to herein must not necessarily have been applied directly on the first plate 21, as long as it still contributes to the melting of the surface layer of the first convex surface 16 of the first plate 21.

The plates 2 may have a thickness of 0.6-1.0 mm and the applying of the melting depressant composition 20 may then comprise applying an average of 0.02-1.0 mg boron and silicon per $mm^2$ on the surface of the plates 2.

The plates 2 may have a thickness of more than 1.0 mm and the applying of the melting depressant composition may then comprise applying an average of 0.02-5.0 mg boron and silicon per $mm^2$ on the surface of the plates 2.

The melting depressant composition may be applied on a surface having an area that is larger than an area defined by the contact points 23, such that metal in the melted metal layer flows to the contact point when allowing the joint to form. Such flow is typically caused by capillary action.

The area of the melting component surface may be at least 10 times larger than the area defined by the contact points 23. The area of the surface may be even larger (or the contact point relatively smaller), such as at least 20 or 30 times larger than the area defined by the contact point. The area of the surface refers to the area of the surface from where melted metal flows to form the joint. Of course the melting depressant composition may be applied on all of the first convex surface 16 of the first plate 21.

The area of the surface may be at least 3 times larger than a cross-sectional area of the joint. The area of the surface may be even bigger (or the cross-sectional area of the joint relatively smaller), such as it is at least 6 or 10 times larger than the area defined by the contact point. The cross-sectional area of the joint may be defined as the cross-sectional area that the joint has across a plane that is parallel to the surface where the contact point is located, at a location where the joint has its smallest extension (cross sectional area).

The joints may comprise at least 50 wt % or at least 85 wt % or even 100 wt % metal (metallic element) that, before the heating, was part of any of the plates 2. This is accomplished by allowing metal of the plates to flow to the contact points 23 and form the joint. A joint that is formed in this way is very different from joints that are formed by brazing, since such joints generally comprises at least 90 wt % metal that, before the brazing, was part of a filler metal of the a brazing substance that was used to form the joint.

The first plates 2 may comprise any of:
i) >50 wt % Fe, <13 wt % Cr, <1 wt % Mo, <1 wt % Ni and <3 wt % Mn;
ii) >90 wt % Fe;
iii) >65 wt % Fe and >13 wt % Cr;
iv) >50 wt % Fe, >15.5 wt % Cr and >6 wt % Ni;
v) >50 wt % Fe, >15.5 wt % Cr, 1-10 wt % Mo and >8 wt % Ni;
vi) >97 wt % Ni;
vii) >10 wt % Cr and >60 wt % Ni;
viii) >15 wt % Cr, >10 wt % Mo and >50 wt % Ni;
ix) >70 wt % Co; and
x) >10 wt % Fe, 0.1-30 wt % Mo, 0.1-30 wt % Ni and >50 wt % Co.

The above means that the plates 2 may be made of a large number of different alloys. Obviously, the examples above are balanced with other metals or elements, as common within the industry.

In a next step 203 the plate package 3 is heated to a temperature which is above 1100° C. The exact temperature can be found in the following examples. During the heating the first convex surface 16 of the first plate 21 melt and forms a surface layer 24 and, together with the melting depressant component, forms a melted metal layer 25 that is in contact with the second concave surface 17 of the second plate 22 at the contact points 23 between the first plate 21 and the second plate 22. When this happen, metal of the melted metal layer flows towards the contact point 23.

In a final step 204 the melted metal layer 25 is allowed to solidify, such that a joint 26 is obtained at the contact points 23 between the plates in the plate package 3 and such that the bent edges 15 form a tight fit between the bent edges 15 of the plates 2 in the plate package 3. i.e. the metal that has flown to the contact points 23 solidifies. By applying 201 the melting depressant composition 20 on only the convex surface 16 of the plates 2 it was surprisingly found that a change in shape of the plates 2 occur such that the convex shape of the plates 2 becomes even more convex, i e the bent edges 15 create a very tight and snug fit to each other in the plate package 3, which becomes more tight than is the case in known brazing techniques Actually, also more tight than the original distance was between the bent edges 15. In comparison, if applying the melting depressant composition 20 only on the concave surface 17 the gap increases between the bent edges 15. The change in shape occurs when the blends alloys with the surface, also meaning that there will be a compressive stress in the surface due to the alloying. If both the melting depressant composition is applied on both the convex surface 16 and the concave surface 17 there will be compressive stresses present in both surfaces, resulting in an increase of the fatigue strength of the plates 2 and the plate package 3.

The solidification typically includes decreasing temperature to normal room temperature. However, solidification also occurs during the physical process of redistribution of components (boron and silicon) in the joint area, before a temperature is decreased.

From the description above follows that, although various embodiments of the invention have been described and shown, the invention is not restricted thereto, but may also be embodied in other ways within the scope of the subject-matter defined in the following claims. Various melting depressant compositions can also be combined with various metals for the metal parts. For example, melting depressant composition (blend) A3.3 may be combined with metal parts made of 316 steel.

EXAMPLES

A number of experiments and examples are now presented for describing suitable materials for the plates, the composition of the melting depressant composition 23, which amounts of melting depressant composition should be used, suitable temperatures for the heating, for how long heating shall be done etc. Thus, the results of these experiments and examples are used for previously described entities like the first plate, the second plate, the melting depressant composition, the contact point, the joint etc., i.e. all previously described entities may incorporate the respectively related features described in connection with the experiments and examples below. In the following the melting depressant composition is referred to as a "blend". Metal plate may be referred to as "parent metal".

Figure 5:
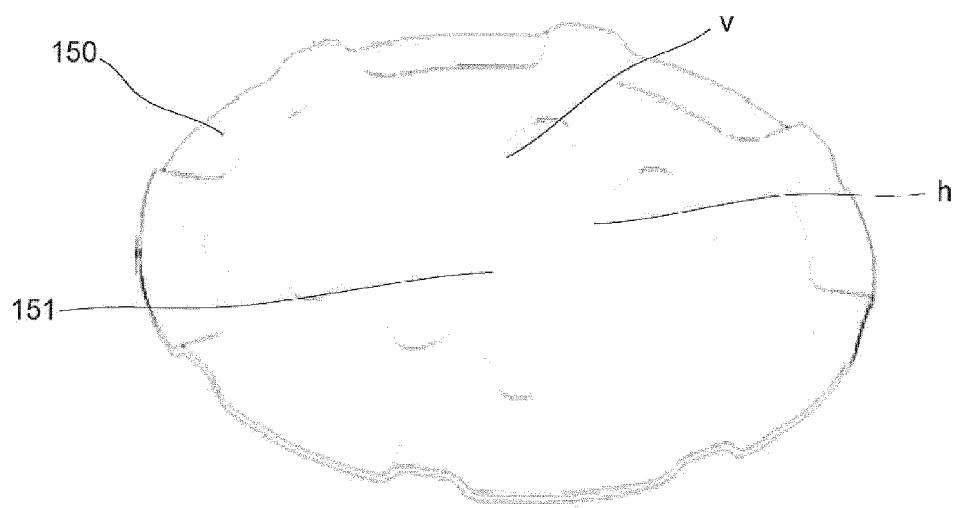
FIG. 5 shows a pressed plate that is used in a number of examples that described how two metal parts may be joined.

FIG. 5 shows a plate 150 that is used for exemplifying how two metal parts may be joined. The plate 150 is a circular, pressed plate, which is 42 mm in diameter, has a thickness of 0.4 mm and is made of stainless steel type 316L (SAE steel grade). The pressed plate 150 has two pressed beams v and h, each approximately 20 mm long. Beam v stands for left beam and beam h stands for right beam. The "v" and "h" are used in examples 5 and 9 below.

Figure 6:
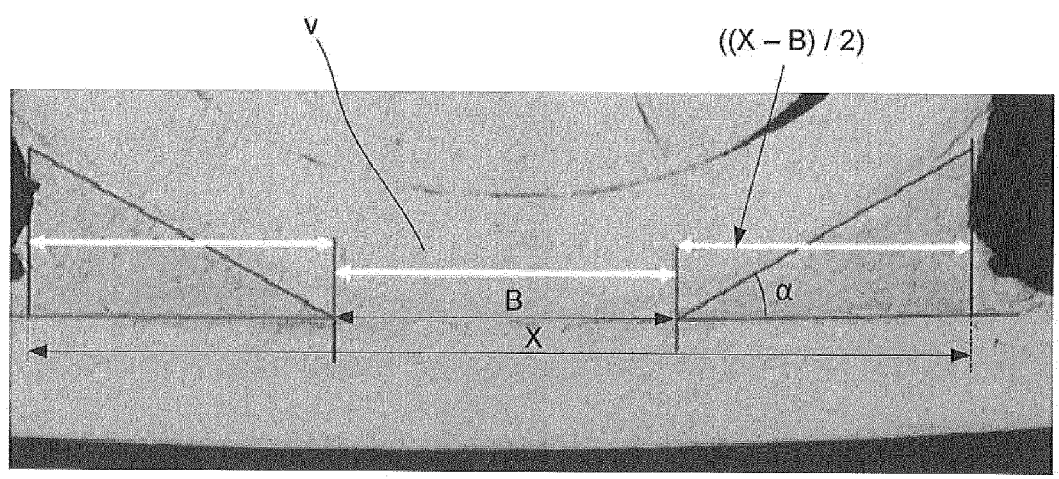
FIG. 6 is a photo of a cross-section of a joint between the plate shown in FIG. 5 and a flat plate.

FIG. 6 shows a cross-section of a joint between a plate 150 of the type shown in FIG. 5 and a flat plate. At the contact point between the beams of the plate 150 and the flat plate a joint is created. To estimate the amount of metal that forms the joint the following approximations and calculations have been made.

It has been estimated that the volume in the center of the joint is negligible. Therefore, the created metal volume for joints over a width like width B (in the example 1.21 mm or less), is set to zero. On the outer sides of the beam v, which has a distance of (X−B)/2, metal has been accumulated. When blend (melting depressant composition) is applied on the flat plate, the plates are held together and heated surface layers of the plates melt and metal in melted form is transported by capillary action to the area of the joint from neighboring areas, thus forming volumes of metal that constitutes the joint.

It is possible to calculate an area by estimating that two triangles are formed on each side of the center of the joint. The angle $\alpha$ in the triangle is measured to 28°. The total measured width is X and the center width is B. The total area A of the two triangles are therefore $A=2\cdot(((X-B)/2)\cdot((X-B)/2)\cdot\tan(\alpha))/2$. When measuring B to 1.21 mm, then $A=2\cdot(((X-1.21)/2)\cdot((X-1.21)/2)\cdot\tan(28))/2$. The total created volume of braze alloy, which has flown to the crevices to form the joint, would be the area times the length of the two beams v, h. Some of the formed braze alloy does not flow to the crevices and is left on the surface where the blend was applied.

Figure 7:
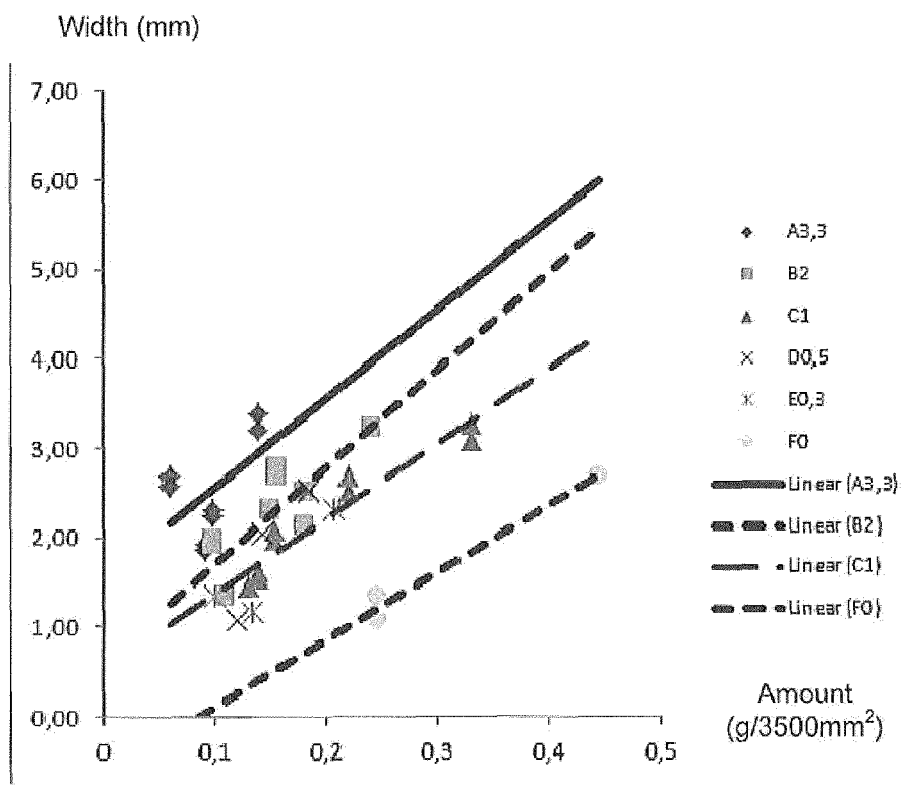
FIG. 7 shows a diagram where a measured joint width is plotted as a function of an applied amount (g/3500 mm$^2$) of melting depressant composition, including trend lines.

FIG. 7 is a diagram showing the measured width as a function of applied amount of different embodiments of the blend (g/3500 mm$^2$, i.e. gram per 3500 square mm) with trend lines. The results of the tests are shown in table 8 and 9 (see Example 5 below) and in FIG. 7. The trend lines of FIG. 3 are bases on function $Y=K\cdot X+L$, where Y is the area, K is the inclination of the line, X is the applied amount of blend and L is a constant. The results of the measured widths and the estimated areas are illustrated by FIG. 7. The applied amounts of blend, see tables 8 and 9, were from 0.06 g/3500 mm$^2$ to 0.96 gram/3500 mm$^2$, which correspond to from approximately 0.017 mg/mm$^2$ to 0.274 mg/mm$^2$.

The trend line $Y=K\cdot X+L$ for the blend was measured, where Y is the joint width, K is the inclination of the line, X is the applied amount of blend and L is a constant, see Fig surface 15 3. Thus, the width of braze joint is:

Y(width for A3.3)=1.554+9.922·(applied amount of blend A3.3)

Y(width for B2)=0.626+10.807·(applied amount of blend B2)

Y(width for C1)=0.537+8.342·(applied amount of blend C1)

Y(width for F0)=0.632+7.456·(applied amount of blend F0)

As observed from FIG. 7 blends A3.3 out of blends A3.3, B2, C1, D0.5, E0.3 and F0 give the highest amount of braze alloy in the joint as a function of applied amount of blend. Sample F0 did not give any substantial joints below 0.20 gram per 3500 mm$^2$.

Figure 8:
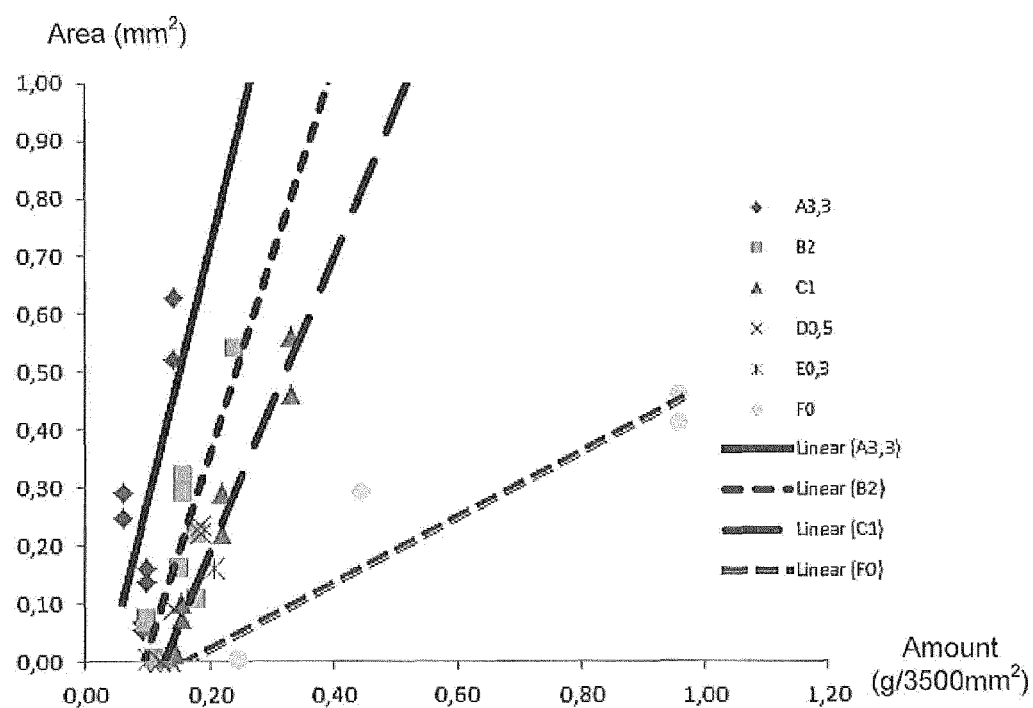
FIG. 8 shows another diagram where a calculated filled area of the joint based on the measured width is plotted as a function of applied amount (g/3500 mm$^2$) of melting depressant composition, including trend lines.

FIG. 8 shows another diagram in which calculated filled area of the braze joint based on the measured width as a function of applied blend amount (gram/3500 mm$^2$) with trend lines is plotted. The trend line $Y=K\cdot X-L$ for the blend were measured, where Y is the area, K is the inclination of the line, X is the applied amount of blend and L is a constant, see FIG. 8. For FIG. 7 the area of braze joint is:

Y(area for A3.3)=4.361·(applied amount of blend A3.3)−0.161

Y(area for B2)=3.372·(applied amount of blend B2)−0.318

Y(area for C1)=2.549·(applied amount of blend C1)−0.321

Y(area for F0)=0.569·(applied amount of blend F0)−0.093

Figure 9:
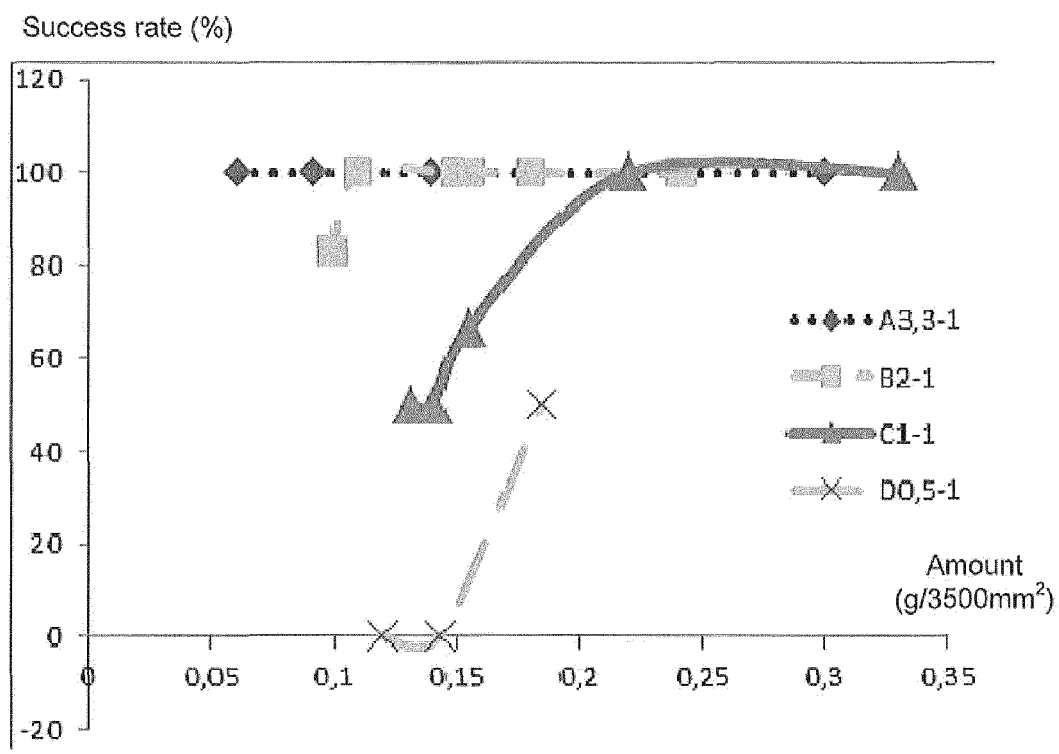
FIG. 9 shows another diagram where the % of tensile tested samples where the joint was stronger or the same as the plate material is plotted as a function of applied amount (g/3500 mm$^2$) of melting depressant composition, including trend lines.

An estimation of the created volume based on the diagram in FIG. 8 for e.g. an amount of 0.18 gram per 3500 mm$^2$, excluding sample F0, due to "no" braze joints and sample D0.5 due to too little data, gives a value for the samples for created volume of braze alloy in the joint between the plates, see the following:

Volume(A3.3)=0.63·length 40(20·2)=25.2 mm$^3$
Volume(B2)=0.30·length 40(20·2)=12.0 mm$^3$
Volume(C1)=0.12·length 40(20·2)=4.8 mm$^3$
Volume(E0.3)=0.10·length 40(20·2)=4.0 mm$^3$ FIG. 9 shows another diagram in which the % (percent) is the success rate of tensile experiments where the joint was stronger or the same as the plate material as a function of applied amount of blend, i.e. gram per 3500 mm$^2$. When the plate was stronger than the joint, resulting in a split of the joint, the result was set to zero. For the samples that the joint were stronger than the plate material the difference in results was not statistical significant.

Figure 10:
FIG. 10 shows a picture of other test samples that has been joined.

FIG. 10 shows a further sample of joining by forming joints by means of a blend. The picture shows that there is a joint formed between the two plates. The sample is from Example 10.

In the following examples in more details are presented for illustrating the invention.

The tests in these examples were made to investigate if silicon, Si, was able to create a "braze alloy" when the silicon was applied on the surface of a test sample of parent metal (i.e. on a metal part). Also, different amounts of boron, B, were added for decreasing the melting point for the braze alloy. Boron is also used for changing the wetting behavior of the braze alloy. Properties of the tested blends were also investigated. In the examples wt % is percent by weight and atm % is percent of atoms. Here, "braze alloy" is referred to as the alloy formed when the silicon and boron causes a part of, or layer of, the parent metal (metal part), to melt. The "braze alloy" thus comprises the blend and metallic elements from the parent metal.

If nothing else is stated the test samples of parent metal for all tests were cleaned by dish washing and with acetone before samples of the blends of silicon and boron were added to the test samples.

Example 1

Example 1 concerns preparation of samples of blends of silicon and boron to be tested. Blend sample No. C1 was prepared by blending 118.0 gram of crystalline silicon powder particle size 325 mesh, 99.5% (metal basis) 7440-21-3 from Alfa Aesar-Johnsson Matthey Company, with 13.06 gram of crystalline boron powder particle size 325 mesh, 98% (metal basis) 7440-42-8 from Alfa Aesar-Johnsson Matthey Company and 77.0 gram of Nicorobraz S-30 binder from Wall Colmonoy in a Varimixer BEAR from Busch & Holm producing 208 gram of paste, see sample C1. All test samples were prepared following the same procedure as blend sample C1. The samples are summarized in Table 2. The prepared blend corresponds to the "melting depressant composition" previously discussed. The boron and the silicon in the blend corresponds to the "melting depressant component" of the melting depressant composition and the binder in the blend corresponds to the "binder component" of the melting depressant composition.

TABLE 2

| Blend sample No. | Boron [gram] | Silicon [gram] | S-30 Binder [gram] | Total Weight [gram] |
|---|---|---|---|---|
| F0 | 0.00 | 124.7 | 73.3 | 198 |
| E0.3 | 4.30 | 123.9 | 72.1 | 200 |
| D0.5 | 6.41 | 121.2 | 75.0 | 203 |
| C1 | 13.06 | 118.0 | 77.0 | 208 |
| B2 | 24.88 | 104.5 | 72.81 | 202 |
| A3.3 | 11.46 | 22.9 | 19.3 | 54.0 |

Samples G15, H100, I66 and J was prepared the same way as samples F0, E0.3, D0.5, C1, B2 and A3.3 with the difference that another binder was used. The binder was Nicorobraz S-20 binder from Wall Colmonoy. These test samples are summarized in Table 3.

TABLE 3

| Blend sample No. | Boron [gram] | Silicon [gram] | S-20 Binder [gram] | Total Weight [gram] |
|---|---|---|---|---|
| G15 | 0.37 | 2.24 | 3.1 | 5.7 |
| H100 | 4.19 | 0 | 5.3 | 9.5 |
| I66 | 1.80 | 2.70 | 5.5 | 10.0 |
| J | 2.03 | 2.02 | 5.0 | 9.0 |

For the blend samples calculations have been made to show ratio, percent by weight and percent by atoms, as shown in Table 4.

TABLE 4

| Blend Sample No. | Ratio [wt:wt] | | Amount [wt %] | | Amount [atm %] | |
|---|---|---|---|---|---|---|
| | Boron | Silicon | Boron | Silicon | Boron | Silicon |
| F0 | 0 | 100 | 0 | 100 | 0 | 100 |
| E0.3 | 3 | 100 | 3 | 97 | 8 | 92 |
| D0.5 | 5 | 100 | 5 | 95 | 12 | 88 |
| C1 | 10 | 100 | 9 | 91 | 21 | 79 |
| B2 | 19 | 100 | 16 | 84 | 33 | 67 |
| A3.3 | 33 | 100 | 25 | 75 | 46 | 54 |
| G15 | 17 | 100 | 14 | 86 | 30 | 70 |
| H100 | 100 | 0 | 100 | 0 | 100 | 0 |
| I66 | 66 | 100 | 40 | 60 | 63 | 37 |
| J | 100 | 100 | 50 | 50 | 72 | 28 |

Binder

The binder (polymeric and solvent) content in the S-20 and S-30 binder was measured. Then the content of "dry" material within the gels was tested. Samples of S-20 binder and S-30 binder were weighted and thereafter placed in an oven for 18 hours at 98° C. After the samples had been taken out of the oven they were weighted again and the results are presented in Table 5.

TABLE 5

| Binder | Before [gram] | After [gram] | Polymeric proportion [wt %] |
|---|---|---|---|
| S-20 | 199.64 | 2.88 | 1.44 |
| S-30 | 108.38 | 2.68 | 2.47 |

Example 2

Example 2 concerns brazing tests, i.e. tests where the blend samples were arranged on metal parts (test parts or test plates). The metal parts had the form of circular test pieces having a diameter of 83 mm and a thickness of 0.8 mm and the metal parts were made of stainless steel type 316L. Two different amounts of blend was used: 0.2 g and 0.4 g. The blend was applied on the metal part. All samples were brazed in a conventional vacuum furnace at 1210° C. for 1 hour. Double tests were performed. Meaning, two amounts of blend, double samples and six different blends, 2·2·6=24 samples. The tested blends are: F0, E0.3, D0.5, C1, B2 and A3.3. The blends were applied on a circular area of the metal part, having a diameter of approximately 10 to 14 mm, i.e. a surface of 78 to 154 mm$^2$. This approximately 1.3-5.1 mg of blend was applied per mm$^2$.

It was observed that the metal of the metal parts had melted, i.e. melts were created. It was also observed that the melts in some aspects appeared as a braze alloy with flow. Without measuring the size of the wetting it appeared that an increased amount of boron in the blends resulted in better wetting. However it was also seen that for several samples the whole thickness of the metal part had melted such that a hole was created in the middle of the metal part. For the "0.2 gram samples" five out of twelve test pieces had holes, and for the "0.4 gram pieces" ten out of twelve had holes. Further tests have shown that, for avoiding holes, it may suitable to apply an average of 0.02-0.12 mg boron and silicon per mm$^2$ when the metal part has a thickness of 0.3-0.6 mm. When the metal part has a thickness of 0.6-1.0 mm 0.02-1.0 mg boron and silicon per mm$^2$ may be suitable. Even more suitable amounts may be empirically determined.

Example 3

Example 3 concerns the applying of the blend on a surface. In this Example the test plates (metal parts) were prepared for fillet tests, corrosion tests and tensile tests at the same time. From Example 2 it was concluded that it could be a risk to apply the blends of silicon and boron in dots or lines on thin-walled plates, as this may create holes in the plates. Therefore, new test samples, i.e. test plates, were used for application of the different the blends of Si and B for the fillet tests, corrosion tests, and the tensile tests.

The new test samples were plates made of stainless steel type 316L. The size of the plates were 100 mm wide, 180 to 200 mm long and the thickness were 0.4 mm. All plates were cleaned by dish washing and with acetone before application of samples of the blends of Si and B. The weight was measured. On each plate a part measured as 35 mm from the short side was masked.

The different test blends A3.3, B2, C1, D0.5, E0.3, F0, G15, H100, and 166 were used. The test plates were painted (by using a conventional brush) with the blends on an unmasked surface area of the plate, which surface area had the size of 100 mm×35 mm. The binder was S-30. After drying for more than 12 hours in room temperature the masking tape was removed and the plate weight was measured for each plate. The weight presented in Table 6 below is the weight of the total amount of the blends on the area of 100 mm×35 mm=3500 mm$^2$=35 cm$^2$. The example shows that blend is easily applied on metal surfaces.

TABLE 6

| Blend sample No. | Ratio B:Si [wt:wt] | Weight of blend + dried binder [gram] | Weight of blend Si + B without binder [gram] | Weight of blend per area [mg/cm$^2$] |
|---|---|---|---|---|
| A3.3 | 33:100 | 0.0983 | 0.0959 | 2.74 |
| B2 | 19:100 | 0.0989 | 0.0965 | 2.76 |
| C1 | 10:100 | 0.1309 | 0.1277 | 3.65 |
| D0.5 | 5:100 | 0.1196 | 0.1166 | 3.33 |
| E0.3 | 3:100 | 0.0995 | 0.0970 | 2.77 |
| H100 | 100:0 | 0.1100 | 0.1073 | 3.07 |
| I66 | 66:100 | 0.0900 | 0.0878 | 2.51 |

Example 4

Example 4 concerns corrosion-bend tests. From test plates slices were cut out having width of 35 mm, meaning having an applied surface area of 35 mm×35 mm. Onto this surface area a circular pressed plate was placed (see FIG. 13) which pressed plate had a size of 42 mm in diameter and 0.4 mm thick made of stainless steel type 316L. The test samples were heated ("brazed") 1 hour at 1210° C. The tested plates for the corrosion tests had applied blend samples A3.3, B2, C1, D0.5, E0.3, H100, 166 and J, see Table 4.

The samples were tested according to corrosion test method ASTM A262, "Standard Practices for Detecting Susceptibility to inter-granular Attack in Austenitic Stainless Steels". "Practice E—Copper—Copper Sulfate—Sulfuric Acid. Test for Detecting Susceptibility to Inter-granular Attack in Austenitic Stainless Steels", was selected from the test method. The reason for selecting this corrosion tests was that there is a risk that boron might react with chromium in the steel to create chromium borides, mainly in the grain boundaries, and then increase the risk for inter-granular corrosion attack, what in the standard is referred to as "practice" was used, boiling 16% sulfuric acid together with copper sulfate in 20 hours and thereafter a bend test, according to chapter 30 in the standard.

The following discusses results from the corrosion-bend test and sectioning of the test samples. The test pieces were bent tested according to the corrosion test method in chapter 30.1 of the standard. None of the samples gave indications of inter granular attack at the ocular investigation of the bended surfaces. After the ASTM investigation the bended test samples were cut, ground and policed and the cross section was studied in light optical microscope in EDS, i.e. Energy Dispersive Spectroscopy. The results are summarized in Table 7.

TABLE 7

| Blend sample No. | Ocular investigation of surface for corrosion cracks when bended according to the ASTM test | Results of metallurgical investigation of the cross sectioned corrosion tested samples and bent tested test samples. SEM-EDS result of cracked phase |
|---|---|---|
| A3.3 | No cracks | No corrosion<br>A surface layer of app. max 8 µm with a few cracks. The phase that had cracked had a high Cr and B content, most probably a chromium boride phase. |
| B2 | No cracks | No corrosion<br>A surface layer of app. max 8 µm with a few cracks. The phase that had cracked had a high Cr and B content, |

TABLE 7-continued

| Blend sample No. | Ocular investigation of surface for corrosion cracks when bended according to the ASTM test | Results of metallurgical investigation of the cross sectioned corrosion tested samples and bent tested test samples. SEM-EDS result of cracked phase |
|---|---|---|
| | | most probably a chromium boride phase |
| C1 | No cracks | No corrosion or cracks |
| D0.5 | No cracks | No corrosion or cracks |
| E0.3 | No cracks | No corrosion |
| | | A surface layer of app. max 60 μm with a few cracks. The phase that had cracked had a high Si content generally <5 wt % |
| H100 | No cracks | Corroded surface and joint |
| I66 | No cracks | No corrosion |
| | | A surface layer of app. max 12 μm with a few cracks. The phase that had cracked had a high Cr and B content, most probably a chromium boride phase |
| J | No cracks | No corrosion |
| | | A surface layer of app. max 20 μm with a few cracks. The phase that had cracked had a high Cr and B content, most probably a chromium boride phase |

Apparently, when adding high amounts of boron, as for sample H100, J, 166, a fragile phase was formed on the surface, most probably a chromium boride phase, increasing with the amount of boron. A fragile phase was not seen in the H100 sample, most probably due to the corrosion on the surface. Also the amount of borides increased with the amount of boron, meaning it has to be taken into consideration that the corrosion properties might decrease when adding high amounts of boron, as for sample H100 that was attacked in the corrosion test. This "negative" effect with boron can be decreased by using thicker parent metals and/or longer diffusion times (time used for allowing the joint to form). It is then possible to dilute boron in the parent metal. Also for the normal amount of boron as for A3.3 and B2 a thinner fragile surface layer was formed. It was seen that for the low amount of boron in the samples, sample E0.3, a quite thick fragile surface layer, with a high silicon content generally >5 wt % of silicon, was formed with a different characteristic than for the fragile surfaces for A3.3, B2, H100, 166 and J. The "negative" effect with silicon can be decreased by using thicker parent metals and/or longer diffusion times. It is then possible to dilute silicon in the parent metal.

Example 5

Example 5 concerns fillet tests of some samples. From test samples made according to Example 3, slices of the plates was cut out with the width of 35 mm, meaning an applied surface of 35 mm×35 mm. Onto this surface a circular pressed plate was placed, see FIG. 5, 42 mm in diameter and 0.4 mm thick, made of stainless steel type 316L. The pressed plate had two pressed beams, each approximately 20 mm long. The samples were brazed at approximately 1 hour at approximately 1200° C.

The results from the fillet test show that there were amounts of braze alloy in the joint area created between a flat surface area (on which the blend was applied), and a pressed beam of the test sample shown in FIG. 5. The amount of braze alloy was calculated by an approximation, see FIG. 6, by calculating an area by estimating that two triangles are formed on each side of the center of the joint. In the middle part there is no or very small amounts of additional formed "brazing alloy". The two triangles can be measured by measuring the height (h) and the base (b), the total area of the two triangles are summing up to (h)·(b) since there are two triangles. The problem with this calculation is that the height is hard to measure. Therefore we use the following equation for calculating of the two triangle areas:

$$A = ((X-B)/2) \cdot ((X-B)/2) \cdot \tan \alpha$$

A is total area of the two triangles, X is the total width of the formed joint, B is the part of the formed joint where the volume of the formed brazing alloy in the center of the joint is negligible. Thus, the base of each triangle is (X−B)/2. The height is calculated by measuring the angle α, which is the angle between the tangents of the pressed beam to the base.

To calculate the volume of the formed braze alloy that had flown to the crevices a length of respective the two beams in contact with the surface measured was measured to 20 mm. The total length of the beams was multiplied with the total area.

The area of two triangles is the estimated area after brazing in Tables 8 and 9. The volume is the volume of the formed brazing alloy on one of the beams. The results from the fillet test are shown in table 8 and 9, and in FIG. 7. In Table 8 and in Table 9 v and h stand for v=left beam and h=right beam.

TABLE 8

(measured valued for the fillet test, samples A3.3-B2/B4)

| Blend sample No. | Applied binder Si + B [gram] | Width [mm] | Estimated Area after brazing [mm$^2$] | Volume [mm$^3$] |
|---|---|---|---|---|
| A3.3x-1v | 0.06 | 2.69 | 0.29 | 5.8 |
| A3.3x-1h | 0.06 | 2.58 | 0.25 | 5.0 |
| A3.3-1v | 0.10 | 2.23 | 0.14 | 2.8 |
| A3.3-1h | 0.10 | 2.31 | 0.16 | 3.2 |
| A3.3-2v | 0.14 | 3.38 | 0.63 | 12.6 |
| A3.3-2h | 0.14 | 3.19 | 0.52 | 10.4 |
| A3.3-3v | 0.09 | 1.92 | 0.07 | 1.4 |
| A3.3-3h | 0.09 | 1.85 | 0.05 | 1.0 |
| B2X-1v | 0.18 | 2.12 | 0.11 | 2.2 |
| B2X-1h | 0.18 | 2.50 | 0.22 | 4.4 |
| B2X-2v | 0.15 | 2.31 | 0.16 | 3.2 |
| B2X-2h | 0.15 | 2.31 | 0.16 | 3.2 |
| B2-1v | 0.10 | 1.96 | 0.07 | 1.4 |
| B2-1h | 0.10 | 1.92 | 0.07 | 1.4 |
| B2-2v | 0.24 | 3.23 | 0.54 | 10.8 |
| B2-2h | 0.24 | 3.23 | 0.54 | 10.8 |
| B2-3v | 0.16 | 2.77 | 0.32 | 6.4 |
| B2-3h | 0.16 | 2.69 | 0.29 | 5.8 |
| B4v | 0.11 | 1.35 | 0.00 | 0 |
| B4h | 0.11 | 1.35 | 0.00 | 0 |

TABLE 9

(measured valued for the fillet test for samples C1 to F0)

| Blend sample No. | Applied binder Si + B [gram] | Width [mm] | Estimated Area after brazing [mm$^2$] | Volume [mm$^3$] |
|---|---|---|---|---|
| C1X-1v | 0.22 | 2.50 | 0.22 | 4.4 |
| C1X-1h | 0.22 | 2.69 | 0.29 | 5.8 |
| C1X-2v | 0.33 | 3.08 | 0.46 | 9.2 |
| C1X-2h | 0.33 | 3.27 | 0.56 | 11.2 |
| C1-1v | 0.13 | 1.46 | 0.01 | 0.2 |
| C1-1h | 0.13 | 1.46 | 0.01 | 0.2 |

TABLE 9-continued (measured valued for the fillet test for samples C1 to F0)

| Blend sample No. | Applied binder Si + B [gram] | Width [mm] | Estimated Area after brazing [mm²] | Volume [mm³] |
|---|---|---|---|---|
| C1-2v | 0.15 | 1.96 | 0.07 | 1.4 |
| C1-2h | 0.15 | 2.08 | 0.10 | 2.0 |
| C1-3v | 0.14 | 1.54 | 0.01 | 0.2 |
| C1-3h | 0.14 | 1.62 | 0.02 | 0.4 |
| D0.5-1v | 0.19 | 2.54 | 0.23 | 4.6 |
| D0.5-1h | 0.19 | 2.50 | 0.22 | 4.4 |
| D0.5-2v | 0.12 | 1.08 | 0.00 | 0 |
| D0.5-2h | 0.12 | 1.08 | 0.00 | 0 |
| D0.5-3v | 0.14 | 2.04 | 0.09 | 1.8 |
| D0.5-3h | 0.14 | 2.04 | 0.09 | 1.8 |
| E0.3-1v | 0.13 | 1.15 | 0.00 | 0 |
| E0.3-1h | 0.13 | 1.15 | 0.00 | 0 |
| E0.3-2v | 0.21 | 2.31 | 0.16 | 3.2 |
| E0.3-2h | 0.21 | 2.31 | 0.16 | 3.2 |
| E0.3-3v | 0.10 | 1.35 | 0.00 | 0 |
| E0.3-3h | 0.10 | 1.35 | 0.00 | 0 |
| F0-1h | 0.45 | 2.69 | 0.29 | 5.8 |
| F0-2v | 0.25 | 1.08 | 0.00 | 0 |
| F0-2h | 0.25 | 1.35 | 0.00 | 0 |
| F0-3v | 0.96 | 2.96 | 0.41 | 8.2 |
| F0-3h | 0.96 | 3.08 | 0.46 | 9.2 |

The results of the measured widths and the estimated areas are presented in Tables 8 and 9, and illustrated in the diagram of FIG. 7. The applied amounts, see Tables 8 and 9, were from 0.06 gram/3500 mm² to 0.96 gram/3500 mm², which corresponds to from approximately 0.017 mg/m² to 0.274 mg/mm².

The trend lines $Y=K \cdot X+L$ for the blends were measured, were Y is the joint width, K is the inclination of the line, X is the applied amount of blend and L is a constant, see FIG. 7. Thus, the width of braze joint is:

Y(width for A3.3)=1.554+9.922·(applied amount of blend A3.3)

Y(width for B2)=0.626+10.807·(applied amount of blend B2)

Y(width for C1)=0.537+8.342·(applied amount of blend C1)

Y(width for F0)=0.632+7.456·(applied amount of blend F0)

As observed from the diagram blends A3.3 out of blends A3.3, B2, C1, D0.5, E0.3 and F0 give the highest amount of braze alloy in the joint as a function of applied amount of blend. Sample F0 did not give any substantial joints below 0.20 gram per 3500 mm².

The trend lines $Y=K \cdot X-L$ for the blends were measured, Y is the area, K is the inclination of the line, X is the applied amount of blend and L is a constant, see FIG. 8.

Y(area for A3.3)=4.361·(applied amount of blend A3.3)−0.161

Y(area for B2)=3.372·(applied amount of blend B2)−0.318

Y(area for C1)=2.549·(applied amount of blend C1)−0.321

Y(area for F0)=0.569·(applied amount of blend F0)−0.093

An estimation on the created volume based on the diagram in FIG. 8 for e.g. an amount of 0.18 gram per 3500 mm², excluding sample F0, due to "no" braze joints and sample D0.5 due to too little data, gives a value for the samples for created volume of braze alloy in the joint between the two beams, see below.

Volume(A3.3)=0.63·length 40(20·2)=25.2 mm³
Volume(B2)=0.30·length 40(20·2)=12.0 mm³
Volume(C1)=0.12·length 40(20·2)=4.8 mm³
Volume(E0.3)=0.10·length 40(20·2)=4.0 mm³

Also, blends with higher proportion of boron were tested, e.g. sample G15, H100, I66 and J. The tested samples did work quite similar to blend A3.3 and B2 regarding the created braze alloy volume. However the metallurgical cross-section of the brazed samples showed that the amount of borides was greater and for sample H100, i.e. pure boron, also brittle high chromium phases were found on the surface where the blend earlier was applied. The hard phases were most probably chromium borides, which decreases the chromium content in the surrounding material, decreasing the corrosion resistance. This may be an issue when good corrosion resistance is wanted but is not an issue for non-corrosive environments. The effect of boron could be decreased by changing the heat treatment and or by using a thicker parent metal that can "absorb" a greater amount of boron. For a thicker material ≥1 mm this effect in the surface will also be less severe since the proportion of the surface volume compared to the parent metal volume is much less than for a thin material <1 mm or <0.5 mm. The chromium borides could be an advantage if better wear resistance is wanted. The metallurgical investigation also showed that for sample F0, i.e. pure silicon, a thick brittle silicon containing phase was found, with a thickness of >50% of the plate thickness for some areas in the investigated sample. The similar phase was also found in the joint. Cracks were found in this phase, with a length >30% of the plate thickness. Such cracks will decrease the mechanical performance of the joined product and can be initiating points for corrosion and or fatigue cracks. The average measured hardness of the phase was over 400Hv (Vickers). This brittle phase is probably may be harder to decrease, compared to the by boride phase, using thicker parent metal or a change in heat treatment. Still for thicker parent metal this effect can be less severe.

Example 6

Example 6 concerns tensile tests of the joints. Then test plates corresponding to those used in Example 3 were sliced into slices. The size of the sliced samples was approximately 10 mm wide, 180 to 200 mm long and has a thickness of 0.4 mm. The applied area for each slice was then 10 mm times 35 mm=350 mm². On the applied area a thicker part, 4 mm, of stainless steel type 316L was placed covering 30 mm of the total 35 mm applied surface. The thicker part was placed at the end of the slice leaving 5 mm of applied surface not covered by the thick plate. By doing this a decrease in the plate material strength due to the applied blend would be detected when tensile testing if the joint is stronger than the plate. The thicker plate was also wider than the 10 mm slices. All test samples were brazed (heated) at approximately 1200° C. for approximately 1 hour.

After heating the thick part was mounted horizontally in a tensile test machine. The slice was firmly bent to 90° to a vertical direction. The samples were mounted so that they could move in horizontal direction. The samples were then loaded and the joint were split.

When the plate was stronger than the joint, so that the joint were split, the result was set to zero. For the samples that the joint were stronger than the plate material the difference in results was not statistical significant. The results are shown as percent (%) of the tested samples where the joint were stronger than or the same as the plate as a function of applied amount, meaning that the joint was not split when tested. The results are summarized in Table 10 and in the diagram of FIG. 9.

TABLE 10

| Blend of Si + B [gram] | Blend A3.3-1 Success Rate [%] | Blend B2-1 Success Rate [%] | Blend C1-1 Success Rate [%] | Blend D0.5-1 Success Rate [%] |
|---|---|---|---|---|
| 0.0600 | 100 | | | |
| 0.0910 | 100 | | | |
| 0.0989 | | 83 | | |
| 0.1092 | | 100 | | |
| 0.1196 | | | | 0 |
| 0.1309 | | | 50 | |
| 0.1399 | 100 | | | |
| 0.1402 | | | 50 | |
| 0.1428 | | | | 0 |
| 0.1500 | | 100 | | |
| 0.1548 | | | 67 | |
| 0.1558 | | 100 | | |
| 0.1800 | | 100 | | |
| 0.1850 | | | | 50 |
| 0.2200 | | | 100 | |
| 0.2417 | | 100 | | |
| 0.3000 | 100 | | | |
| 0.3300 | | | | 100 |

Example 7

To establish the relationship between applied amount of blend and the risk for creating holes through the plates, new tests were performed. For all tests blend B2, see Table 6, was used. Blend B2 comprises also binder S-30. The test pieces which were tested were circular having a thickness of 0.8 mm and having a diameter of 83 mm. The parent metal in the test plates were stainless steel type 316. For all samples the blend was applied in the center of the test sample. The applied area was 28 mm$^2$, i.e. circular spot having a diameter of 6 mm. All test samples were weighted before and after application, and the results are summarized in Table 11. Thereafter the test samples were placed in a furnace at room temperature for 12 hours. The samples were weighted again.

The test samples were all put in a furnace and were heated (also referred to as "brazed") at 1210° C. for approximately 1 hour. During brazing only the outer edges of each sample were in contact with the fixture material, keeping the plate center bottom surface not in contact with any material during brazing. The reason for keeping the plate center bottom surface free of contacts is that a collapse or a burn through might be prevented if the center material is supported from below by the fixture material.

Applied amount and burn through results for the 0.8 mm samples are summarized in Table 11.

TABLE 11

| Sample No. | Blend of Si + B and additional wet binder S-30 [gram] | Blend of Si + B and additional wet binder S-30 [mg/mm$^2$] | Blend of Si + B and additional dried binder S-30 [mg/mm$^2$] | Calculated amount of Blend of Si + B without binder [mg/mm$^2$] | Burn through [1] or [0] |
|---|---|---|---|---|---|
| 1 | 0.020 | 0.714 | 0.464 | 0.453 | 0 |
| 2 | 0.010 | 0.357 | 0.232 | 0.226 | 0 |
| 3 | 0.040 | 1.429 | 0.928 | 0.905 | 0 |
| 4 | 0.030 | 1.0714 | 0.696 | 0.679 | 0 |
| 5 | 0.050 | 1.786 | 1.161 | 1.132 | 0 |
| 6 | 0.060 | 2.143 | 1.393 | 1.359 | 0 |
| 7 | 0.070 | 2.500 | 1.625 | 1.585 | 0 |
| 8 | 0.080 | 2.857 | 1.857 | 1.811 | 0 |
| 9 | 0.090 | 3.214 | 2.089 | 2.037 | 0 |
| 10 | 0.100 | 3.571 | 2.321 | 2.264 | 0 |
| 11 | 0.110 | 3.928 | 2.554 | 2.491 | 1 |
| 12 | 0.120 | 4.285 | 2.786 | 2.717 | 1 |
| 13 | 0.130 | 4.642 | 3.018 | 2.943 | 1 |
| 14 | 0.150 | 5.357 | 3.482 | 3.396 | 1 |
| 15 | 0.170 | 6.071 | 3.946 | 3.849 | 1 |
| 16 | 0.190 | 6.786 | 4.411 | 4.302 | 1 |
| 17 | 0.210 | 7.500 | 4.875 | 4.755 | 1 |
| 18 | 0.230 | 8.214 | 5.339 | 5.207 | 1 |
| 19 | 0.280 | 10.000 | 6.500 | 6.339 | 1 |
| 20 | 0.290 | 10.357 | 6.732 | 6.566 | 1 |

The tests show that there is a burn (hole) through between sample 10 and 11 for a plate having a thickness of 0.8 mm. Sample 10 has 2.264 mg/mm$^2$ applied amount of blend and sample 11 has 2.491 mg/mm$^2$. For joining plates having thickness less than 1 mm, there is a risk with an amount within the range from about 2.830 mg/mm$^2$ to about 3.114 mg/mm$^2$ for burning through the plates, the amount in the middle of this range is 2.972 mg/mm$^2$. Therefore, for a plate having a thickness less than 1 mm an amount of less than 2.9 mg/mm$^2$ would be suitable for avoiding burning through the plate.

Example 8

In Example 8 a braze joint between two pressed heat exchanger plates are made in three different ways. The thickness of the heat exchanger plates are 0.4 mm.

In the first and second test samples an iron-based braze filler with a composition close to stainless steel type 316 was used. See WO 2002/38327 for the braze filler. The braze filler had an increased amount of silicon to about 10 wt %, an amount boron to about 0.5 wt % and a decreased amount of Fe of about 10.5 wt %. In the first test sample the braze filler was applied in lines and in the second test sample the braze filler was applied evenly on the surface. In both cases the filler was applied after pressing.

Brazing test sample 1 showed that the braze filler applied in lines was drawn to the braze joints. Some of the braze filler did not flow to the braze joint and therefore increased the thickness locally at the applied line. For test sample 2 the braze filler flowed to the braze joints, however some on the braze filler remained on the surface and increased the thickness. In test samples 1 and 2 the amount of braze filler corresponds to an amount of approximately 15 wt % of the plate material.

In test sample 3 the A3.3 blend was used, see Table 6. The blend was applied before pressing evenly on the plate. The blend was applied in an amount that would create braze joint with similar sizes as for test samples 1 and 2.

Test sample 3 was applied with a layer having a thickness corresponding to a weight of approximately 1.5 wt % of the plate material. By applying blend A3.3 a braze alloy was formed from the parent metal (metal part), and the formed braze alloy flow to the braze joints. Accordingly, the thickness of the plate decreased since more material was drawn to the braze joint than added blend on the surface.

Example 9

Example 9 concerns tests with different boron and silicon sources. The purpose was to investigate alternative boron sources and silicon sources. Blend B2, see Table 6, was selected as reference for the tests. The alternative sources were tested in respect of their ability to create a joint. For each experiment either an alternative boron source or an alternative silicon source was tested. When using an alternative source the other element influence was assumed to be zero, meaning that it was only the weight of boron or silicon in the alternative component that was "measured", see Table 12. For the reference blend B2, the weight ratio between silicon and boron is 10 gram to 2 gram summing up to 12 gram. Each blend included S-30 binder and the blend was applied on a steel plate according to Example 1. All samples were brazed in a vacuum furnace at 1210° C. for 1 hour.

TABLE 12

| Sample | Alternative source | Added Amount [Si] [gram] | Added Amount [B] [gram] | Corresponding Amount [Si] [gram] | Corresponding Amount [B] [gram] |
|---|---|---|---|---|---|
| Si—B | Si—B | 10.0 | 2.0 | 10.0 | 2.0 |
| Si—B$_4$C | B$_4$C | 10.0 | 2.6 | 10.0 | 2.0 |
| Si—FeB | FeB | 10.1 | 12.5 | 10.1 | 2.0 |
| FeSi—B | FeSi | 30.2 | 2.0 | 10.1 | 2.0 |
| Si—NiB | NiB | 10.1 | 13.0 | 10.1 | 2.0 |

The trend line $Y=K \cdot X+L$ for blend B2 was measured, Y is the joint width, K is the inclination of the line for B2, X is the applied amount of blend and L is a constant for no applied amount of blend B2, see FIG. 7. Thus, the width of braze joint $Y=0.626+10.807 \cdot$(applied amount of blend).

In Table 13 v and h stand for v=left beam and h=right beam as in Example 5.

TABLE 13

| Sample | Applied Amount [gram] | Joint Calculated Width Y [mm$^2$] | Joint Measured Width [mm$^2$] |
|---|---|---|---|
| Si—B$_4$C-v | 0.22 | 3.0 | 2.69 |
| Si—B$_4$C-h | 0.22 | 3.0 | 2.88 |

TABLE 13-continued

| Sample | Applied Amount [gram] | Joint Calculated Width Y [mm$^2$] | Joint Measured Width [mm$^2$] |
|---|---|---|---|
| Si—FeB-v | 0.26 | 3.4 | 1.73 |
| Si—FeB-h | 0.26 | 3.4 | 1.73 |
| FeSi—B-v | 0.29 | 3.8 | 2.1 |
| FeSi—B-h | 0.29 | 3.8 | 2.1 |
| Si—NiB-v | 0.39 | 4.8 | 2.69 |
| Si—NiB-h | 0.39 | 4.8 | 2.88 |

The results in Table 13 show that it is possible to use B4C, NiB and FeB as alternatives source to boron. When NiB were used the created amount was less than for pure boron. However, NiB could be used if an Ni alloying effect is wanted.

Example 10

In Example 10 a large number of different parent metals were tested, i.e. metals that may be used for the metal parts 11 and 12 of FIG. 1. All tests except for the mild steel and a Ni—Cu alloy were tested according to "test Y" (see below).

For test Y two circular pressed test pieces with a thickness of approximately 0.8 mm were placed onto each other. Each sample had a pressed circular beam. The top faces of the beams were placed towards each other creating a circular crevice between the pieces. For each sample the B2 blend, which in this example comprises binder S-20, was applied with a paint brush. The weight of the added amount of blend was not measured since the applying was not homogenous when applying with the paint brush. A picture of one of the samples after joining is presented in FIG. 10.

The mild steel samples and the Ni—Cu samples were applied in the same way, but for mild steel according to the tests made in example 5 "fillet test" and for the Ni—Cu test with two flat test pieces. The samples except for the Ni—Cu were "brazed" in a furnace at approximately 1200° C., i.e. 1210° C., for 1 h in vacuum atmosphere furnace. The Ni—Cu sample was brazed at approximately 1130° C. for approximately 1 h in the same vacuum furnace. After "brazing" a joint was formed between the pieces for all tests. A flow of created "braze alloy" (made of the parent metal) to the joint was also observed for all tested samples. The results are shown on Table 14.

TABLE 14

| Parent metal Sample No. | Cr [wt %] | Fe [wt %] | Mo [wt %] | Ni [wt %] | Cu [wt %] | Mn [wt %] | After Brazing Created joint? | After Brazing Flow of Brazing Alloy? |
|---|---|---|---|---|---|---|---|---|
| 1 | — | 0.3 | — | 99 | — | 0.2 | Yes | Yes |
| 2 | 21 | 0.6 | 16 | 62 | 0.4 | — | Yes | Yes |
| 3 | 22 | 0.7 | 16 | 59 | 1.6 | — | Yes | Yes |
| 4 | 0.6 | 1.9 | 29 | 68 | 0.2 | — | Yes | Yes |
| 5 | 21 | 4.4 | 13 | 58 | — | — | Yes | Yes |
| 6 | 19 | 5.0 | 9.0 | 63 | 0.4 | — | Yes | Yes |
| 7 | 15 | 5.5 | 17 | 60 | — | 0.3 | Yes | Yes |
| 8 | 1.1 | 5.6 | 28 | 63 | 0.6 | 0.4 | Yes | Yes |
| 9 | 19 | 6.2 | 2.6 | 70 | 1.7 | 0.4 | Yes | Yes |
| 10 | 33 | 32 | 1.7 | 33 | 0.4 | 0.6 | Yes | Yes |
| 11 | 27 | 33 | 6.5 | 32 | 1.1 | 1.4 | Yes | Yes |
| 12 | 27 | 36 | 3.4 | 32 | 1.0 | 1.4 | Yes | Yes |

TABLE 14-continued

| Parent metal Sample No. | Cr [wt %] | Fe [wt %] | Mo [wt %] | Ni [wt %] | Cu [wt %] | Mn [wt %] | After Brazing Created joint? | After Brazing Flow of Brazing Alloy? |
|---|---|---|---|---|---|---|---|---|
| 13 | 24 | 44 | 7.2 | 23 | 0.3 | 1.5 | Yes | Yes |
| 14 | 20 | 48 | 4.3 | 25 | 1.1 | 1.2 | Yes | Yes |
| 15 | 19 | 50 | 6.3 | 25 | 0.2 | — | Yes | Yes |
| 16 | 20 | 54 | 6.5 | 19 | 0.6 | 0.4 | Yes | Yes |
| 17 | 29 | 64 | 2.4 | 3.5 | — | — | Yes | Yes |
| 18 | 28 | 66 | 2.2 | 3.5 | — | — | Yes | Yes |
| 19 | 0.3 | 1.1 | — | 66 | 31 | 1.6 | Yes | Yes |
| 20 | 0.17 | 99.5 | — | — | — | 0.3 | Yes | Yes |

The results in Table 14 show that braze alloys are formed between the blend and the parent metal for each sample 1 to 20. The results show also that joints were created for each tested sample.

The examples show that boron was needed to create substantial amount of braze alloy, which could fill the joints and also create strength in the joints. The examples also showed that boron was needed for the microstructure, since a thick fragile phase was found for the samples with no boron.

From above follows that the parent metal, i.e. the metal parts described in connection with e.g. FIG. 1, may be made of an alloy comprising elements such as iron (Fe), chromium (Cr), nickel (Ni), molybdenum (Mo), manganese (Mn), copper (Cu), etc. Some examples of alloys to be used for the metal parts are found in the list in Table 15.

TABLE 15

| Parent metal (metal parts) | Approximate. solidus temperature [° C.] | Approximate. liquidus temperature [° C.] |
|---|---|---|
| Nickel 200/201 | 1435 | 1445 |
| Nicrofer 5923hMo | 1310 | 1360 |
| Hastelloy ® C-2000 ® Alloy | 1328 | 1358 |
| Hastelloy B3 | 1370 | 1418 |
| Alloy C22 | 1357 | 1399 |
| Inconel 625 | 1290 | 1350 |
| Alloy C 276 | 1325 | 1370 |
| Nicrofer 3033 | 1330 | 1370 |
| Nicrofer 3127HMo | 1350 | 1370 |
| AL6XN | 1320 | 1400 |
| 254SMO | 1325 | 1400 |
| Monel 400 | 1299 | 1348 |
| Pure Cu | 1085 | 1085 |
| Mild steel | 1505 | 1535 |
| Stainless steel Type 316 | 1390 | 1440 |
| Stainless steel type 304 | 1399 | 1421 |

The blend, i.e. the melting depressant composition, may be applied by painting as described above. The blend may also be applied by means such as physical vapor deposition (PVD), or chemical vapor deposition (CVD), in which case the blend does not need to include a binder component. It is possible to apply the silicon in on layer and the boron in one layer, by painting or by PVD or CVD. Still, even if applied in layers both the boron and the silicon is considered to be included in the melting depressant composition since they will interact during the heating, just as if they were mixed before the applying.

The invention claimed is:

1. A method for producing a permanently joined plate heat exchanger comprising a plurality of metal heat exchanger plates having a solidus temperature above 1100° C., provided beside each other and forming a plate package with first plate interspaces for a first medium and second plate interspaces for a second medium, wherein the first and second plate interspaces are provided in an alternating order in the plate package,
   wherein each heat exchanger plate comprises a heat transfer area and an edge area comprising bent edges which extend around the heat transfer area,
   wherein a first surface of the plates forms a convex shape and a second surface of the plates forms a concave shape
   wherein the heat transfer area comprises a corrugation of elevations and depressions,
   wherein said corrugation of the plates and the bent edges are provided by pressing the plates
   the method comprising
   applying a melting depressant composition on at least a part of the first convex surface of a first plate, the melting depressant composition comprising
   a melting depressant component that comprises at least 25 wt % boron and silicon for decreasing a melting temperature of the first plate, and
   optionally, a binder component for facilitating the applying of the melting depressant composition on the first convex surface,
   bringing a second concave surface of a second plate into contact with the melting depressant composition on said first convex surface of the first plate by stacking the plates into a plate package,
   heating the first and second plates to a temperature above 1100° C., said first convex surface of the first plate thereby melting such that a surface layer of the first plate melts and, together with the melting depressant component, forms a molten metal layer that is in contact with the second plate at contact points between the first plate and the second plate, and
   allowing the molten metal layer to solidify, such that a joint is obtained at the contact points between the plates in the plate package and such that the bent edges form a tight fit between the bent edges of the plates in the plate package.

2. The method according to claim 1, wherein the boron originates from any of elemental boron and boron of a boron compound selected from any of the following compounds: boron carbide, silicon boride, nickel boride and iron boride.

3. The method according to claim 1, wherein the silicon originates from any of elemental silicon and silicon of a silicon compound selected from any of the following compounds: silicon carbide, silicon boride and ferrosilicon.

4. The method according to claim 1, wherein the melting depressant component comprises at least 40 wt % boron and silicon.

5. The method according to claim 1, wherein the melting depressant component comprises at least 85 wt % boron and silicon.

6. The method according to claim 1, wherein boron constitutes at least 10 wt % of the boron and silicon content of the melting depressant component.

7. The method according to claim 1, wherein boron constitutes at least 55 wt % of the boron and silicon content of the melting depressant component.

8. The method according to claim 1, wherein the melting depressant component comprises less than 50 wt % metallic elements.

9. The method according to claim 1, wherein the melting depressant component comprises less than 10 wt % metallic elements.

10. The method according to claim 1, wherein the first plate has a thickness of 0.3-0.6 mm and the applying of the melting depressant composition comprises applying an average of 0.02-0.12 mg boron and silicon per $mm^2$ on the first convex surface of the first plate.

11. The method according to claim 1, wherein the first metal part comprises a thickness of 0.6-1.0 mm and the applying of the melting depressant composition comprises applying an average of 0.02-1.0 mg boron and silicon per $mm^2$ on the first convex surface of the first plate.

12. The method according to claim 1, wherein the applying of the melting depressant composition comprises
heating the plates until the melting depressant composition binds to the first convex surface of the first plate, and
decreasing the temperature of the plates, before all boron and silicon in the melting depressant composition have formed a compound with the metal in the first plate.

13. The method according to claim 1, wherein the applying of the melting depressant composition is made before the pressing of the plates.

14. The method according to claim 1, wherein the applying of the melting depressant composition is made after the pressing of the plates.

15. The method according claim 1, wherein the applying of the melting depressant composition is made after stacking the plates into a plate package by flushing a suspension containing the melting depressant composition through the plate package.

16. The method according to claim 1, wherein the applying of the melting depressant composition is made by means of screen-printing.

17. The method according to claim 1, wherein the applying of the melting depressant composition is made by means of sputtering onto a coil which is cut into plates.

18. The method according to claim 1, wherein the first surface has an area that is larger than an area defined by the contact points on said surface, such that metal in the melted metal layer flows to the contact point when allowing the joint to form.

19. The method according to claim 18, wherein the area of the convex surface is at least 10 times larger than the area defined by the contact point.

20. The method according to claim 18, wherein the area of the surface is at least 3 times larger than a cross-sectional area of the joint.

21. The method according to claim 1, wherein the joint comprises at least 50 wt % metal that, before the heating, was part of any of the plates.

22. The method according to claim 1, wherein the plates comprises >50 wt % Fe, <13 wt % Cr, <1 wt % Mo, <1 wt % Ni and <3 wt % Mn.

23. The method according to claim 1, wherein the plates comprises >90 wt % Fe.

24. The method according to claim 1, wherein the plates comprises >65 wt % Fe and >13 wt % Cr.

25. The method according to claim 1, wherein the plates comprises >50 wt % Fe, >15.5 wt % Cr and >6 wt % Ni.

26. The method according to claim 1, wherein the plates comprises >50 wt % Fe, >15.5 wt % Cr, 1-10 wt % Mo and >8 wt % Ni.

27. The method according to claim 1, wherein the plates comprises >97 wt % Ni.

28. The method according to claim 1, wherein the plates comprises >10 wt % Cr and >60 wt % Ni.

29. The method according to claim 1, wherein the plates comprises >15 wt % Cr, >10 wt % Mo and >50 wt % Ni.

30. The method according to claim 1, wherein the plates comprises >70 wt % Co.

31. The method according to claim 1, wherein the first plate comprises >10 wt % Fe, 0.1-30 wt % Mo, 0.1-30 wt % Ni and >50 wt % Co.

32. A permanently joined plate heat exchanger comprising a plurality of metal heat exchanger plates having a solidus temperature above 1100° C., provided beside each other and forming a plate package with first plate interspaces for a first medium and second plate interspaces for a second medium, wherein the first and second plate interspaces are provided in an alternating order in the plate package,
wherein each heat exchanger plate comprises a heat transfer area and an edge area comprising bent edges which extend around the heat transfer area,
wherein a first surface of the plates forms a convex shape and a second surface of the plates forms a concave shape
wherein the heat transfer area comprises a corrugation of elevations and depressions,
wherein said corrugation of the plates and the bent edges are provided by pressing the plates,
wherein the plate heat exchanger is produced by the method according to claim 1.

33. The plate heat exchanger according to claim 32 comprising a first plate that is joined with a second plate by a joint, the plates having a solidus temperature above 1100° C., wherein the joint comprises at least 50 wt % metallic elements that have been drawn from an area that surrounds the joint and was part of any of the first plate and the second plate.

* * * * *